(12) United States Patent
Webb

(10) Patent No.: US 6,182,710 B1
(45) Date of Patent: Feb. 6, 2001

(54) METHOD FOR DISPENSING FUEL

(75) Inventor: R. Michael Webb, Eau Claire, WI (US)

(73) Assignee: U-Fuel, Inc. (NV), Eau Claire, WI (US)

( * ) Notice: Under 35 U.S.C. 154(b), the term of this patent shall be extended for 0 days.

(21) Appl. No.: 09/517,949

(22) Filed: Mar. 3, 2000

Related U.S. Application Data

(63) Continuation of application No. 09/457,544, filed on Apr. 9, 1998, which is a continuation of application No. 09/032,187, filed on Feb. 27, 1998, now Pat. No. 6,039,123, which is a continuation of application No. 08/720,806, filed on Oct. 1, 1996, now Pat. No. 5,950,872, which is a continuation-in-part of application No. 08/215,224, filed on Mar. 21, 1994, now Pat. No. 5,562,162, which is a continuation of application No. 08/194,751, filed on Feb. 10, 1994, now abandoned, which is a continuation of application No. 07/760,747, filed on Sep. 16, 1991, now abandoned, which is a continuation-in-part of application No. 07/607,567, filed on Nov. 1, 1990, now Pat. No. 5,305,926, which is a continuation-in-part of application No. 07/332,462, filed on Mar. 30, 1989, now Pat. No. 4,988,020.

(51) Int. Cl.[7] ................. B65B 1/04; B65B 3/04
(52) U.S. Cl. .................. 141/1; 141/2; 141/18; 141/82; 141/94; 141/231; 222/1; 222/129; 222/131
(58) Field of Search ................. 141/2, 18, 82, 141/86, 94, 231; 137/551, 565.01, 565.17, 587; 222/1, 129, 131, 108

(56) References Cited

U.S. PATENT DOCUMENTS

| | | | |
|---|---|---|---|
| 150,606 | 5/1874 | Perkins | 220/88.1 X |
| 450,494 | 4/1891 | Proctor | 222/51 |
| 923,183 | 6/1909 | Johnson | 222/51 X |
| 1,263,751 | 4/1918 | Elkins | 222/155 |
| 1,331,615 | 2/1920 | Brady | 222/51 |
| 1,562,991 | 11/1925 | Rudigier | 222/131 |
| 1,588,863 | 6/1926 | Walker | 220/88.1 X |

(List continued on next page.)

FOREIGN PATENT DOCUMENTS

| | | |
|---|---|---|
| 850828 | 12/1939 | (FR) . |
| 0944916 | 12/1963 | (GB) . |
| 1007251 | 10/1965 | (GB) . |

OTHER PUBLICATIONS

"Introducing a New Concept for on Site Storage and Dispensing of Fuel. Double Skin Cylindrical Tank Installations with the Maximum Advantages." E.W. Taylor Fuel Control Ltd., Harlow, Essex, Jan. 1988.

"Self Contained Portable Diesel Installation," E.W. Taylor Fuel Control Ltd., Harlow, Essex.

"Gasboy 390".

Jane's Airport Equipment, Sep. 1986, 1986/1987.

Primary Examiner—Timothy L. Maust
(74) Attorney, Agent, or Firm—Knoble & Yoshida, LLC.

(57) ABSTRACT

An improved aboveground system for storing a combustible fluid such as gasoline includes a storage tank that is constructed and arranged to store a combustible fluid such as gasoline and an outer tank to provide secondary containment. An interstitial space is defined between the outer tank and the storage tank. A pipe for communicating with the storage tank extends through the wall of the storage tank, into the interstitial space and through the interstitial space for a distance so as to extend substantially parallel to at least one of the walls of the outer tank and the storage tank, and then through the wall of the outer tank, whereby fluid may be supplied to or withdrawn from the storage tank. Advantageously, access structure is provided for gaining access through the wall of the outer tank to the portion of the pipe that extends through the interstitial space for a distance so as to extend substantially parallel to at least one of the walls of the outer tank and the storage tank.

9 Claims, 22 Drawing Sheets

U.S. PATENT DOCUMENTS

| | | |
|---|---|---|
| 1,604,257 | 10/1926 | Brooks .................. 220/88.1 X |
| 1,908,684 | 5/1933 | Buchanan ............... 220/DIG. 24 X |
| 2,056,179 | 10/1936 | Fitch ..................... 280/838 |
| 2,141,638 | 12/1938 | Bean ..................... 222/51 X |
| 2,189,945 | 2/1940 | Fitch ..................... 220/DIG. 24 |
| 2,259,319 | 10/1941 | Norbon ................... 280/832 |
| 2,285,830 | 6/1942 | Paget ..................... 220/900 X |
| 2,307,616 | 1/1943 | Booth ..................... 222/155 X |
| 2,327,475 | 8/1943 | Waugh .................... 222/173 |
| 2,425,962 | 8/1947 | Sill ........................ 222/547 X |
| 2,449,270 | 9/1948 | Bennett ................... 169/57 |
| 2,757,744 | 8/1956 | Malone .................... 169/66 |
| 2,757,823 | 8/1956 | Blanchard et al. ........ 222/155 |
| 2,784,747 | 3/1957 | Weempe ................... 280/838 |
| 2,792,148 | 5/1957 | Goldenberg ............... 222/2 |
| 2,867,282 | 1/1959 | Bagno et al. ............. 169/66 |
| 3,019,843 | 2/1962 | Powell .................... 169/66 |
| 3,120,273 | 2/1964 | Kaufman et al. ......... 169/66 |
| 3,172,566 | 3/1965 | Mullin et al. ............ 222/131 X |
| 3,172,581 | 3/1965 | Nanni ..................... 222/464 |
| 3,240,388 | 3/1966 | Brainard .................. 222/51 |
| 3,366,280 | 1/1968 | Sampson et al. ......... 222/173 |
| 3,419,882 | 12/1968 | Schroeder et al. ........ 235/94 A |
| 3,421,665 | 1/1969 | Paton ..................... 222/608 |
| 3,601,284 | 8/1971 | Yamawaki ................ 222/2 |
| 3,782,599 | 1/1974 | Luginbühl ................. 222/51 |
| 3,786,421 | 1/1974 | Wostl et al. ............. 235/381 |
| 3,835,930 | 9/1974 | Denigan, Jr. et al. .... 169/86 |
| 3,863,687 | 2/1975 | Alquist ................... 141/45 |
| 3,889,701 | 6/1975 | Mueller ................... 280/838 |
| 3,931,497 | 1/1976 | Gentile et al. ........... 902/22 X |
| 4,085,313 | 4/1978 | Van Ness ................. 235/381 |
| 4,097,724 | 6/1978 | Roberson ................. 235/9 AA X |
| 4,131,214 | 12/1978 | Rogers .................... 222/608 |
| 4,177,863 | 12/1979 | Simon ..................... 169/66 |
| 4,249,392 | 2/1981 | Hotta ..................... 222/131 X |
| 4,346,012 | 8/1982 | Umaba et al. ............ 252/7 |
| 4,354,620 | 10/1982 | Tsuneda et al. ........... 222/14 |
| 4,397,405 | 8/1983 | Batson .................... 222/14 |
| 4,403,075 | 9/1983 | Byrd et al. .............. 428/426 X |
| 4,469,129 | 9/1984 | Dixon ..................... 220/903 X |
| 4,541,545 | 9/1985 | Beattie et al. ............ 220/88.1 X |
| 4,561,292 | 12/1985 | Pugnale et al. ........... 220/426 X |
| 4,615,362 | 10/1986 | Hartman et al. .......... 141/86 |
| 4,638,928 | 1/1987 | Webster ................... 222/155 OR |
| 4,685,327 | 8/1987 | Sharp ..................... 73/49.2 |
| 4,782,511 | 11/1988 | Nemec et al. ............ 379/106 X |
| 4,784,902 | 11/1988 | Crompton ................. 428/284 X |
| 4,807,675 | 2/1989 | Sharp ..................... 141/86 |
| 4,838,356 | 6/1989 | Akatsu ................... 169/66 |
| 4,839,065 | 6/1989 | Vandersall ............... 252/603 |
| 4,842,139 | 6/1989 | Krieg ..................... 206/386 |
| 4,881,579 | 11/1989 | Sharp ..................... 141/86 |
| 4,911,326 | 3/1990 | McGouran, Jr. .......... 220/855 X |
| 4,960,222 | 10/1990 | Fields, III ............... 220/5 |
| 5,010,238 | 4/1991 | Kadono et al. ........... 908/8 X |
| 5,032,447 | 7/1991 | Bailey .................... 428/74 X |
| 5,038,456 | 8/1991 | McGarvey ................ 220/88.1 X |
| 5,081,761 | 1/1992 | Rinehart et al. .......... 220/444 X |
| 5,088,530 | 2/1992 | Harp ...................... 141/88 |
| 5,104,700 | 4/1992 | Peterson ................. 220/88.1 X |
| 5,265,656 | 11/1993 | McGarvey ................ 141/86 |
| 5,284,191 | 2/1994 | McGarvey ................ 141/198 |
| 5,314,027 | 5/1994 | Wood ..................... 169/60 |
| 5,330,009 | 7/1994 | Zhang ..................... 169/66 |
| 5,333,785 | 8/1994 | Dodds et al. ............ 239/69 |
| 5,573,066 | 11/1996 | Vaillancourt et al. ..... 222/608 |

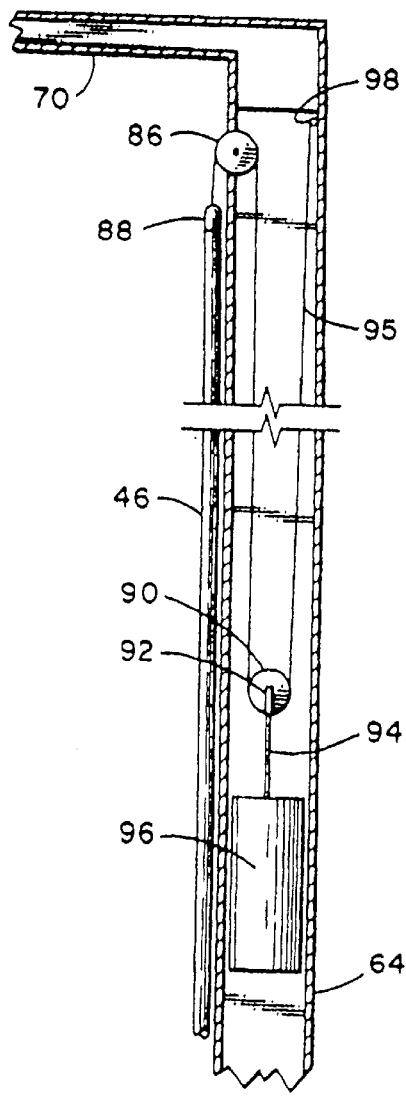
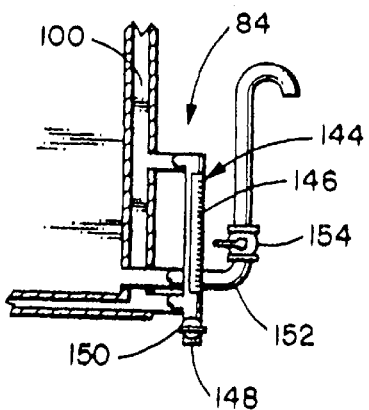
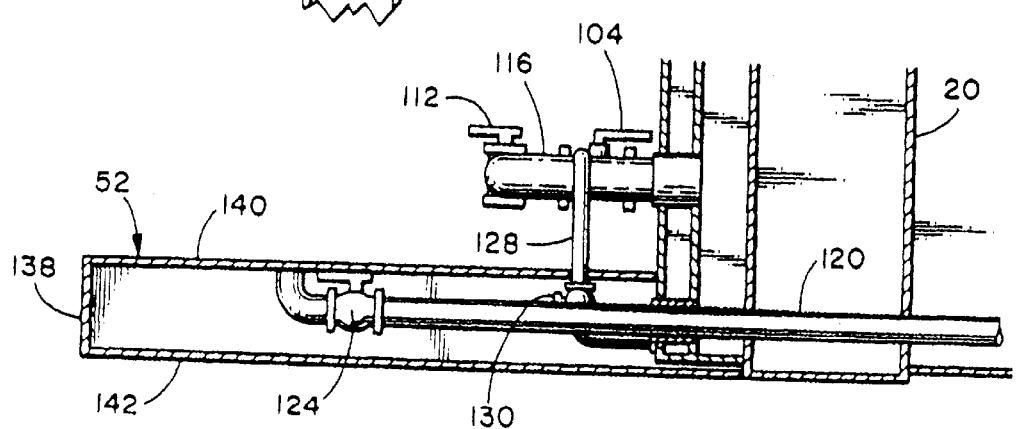

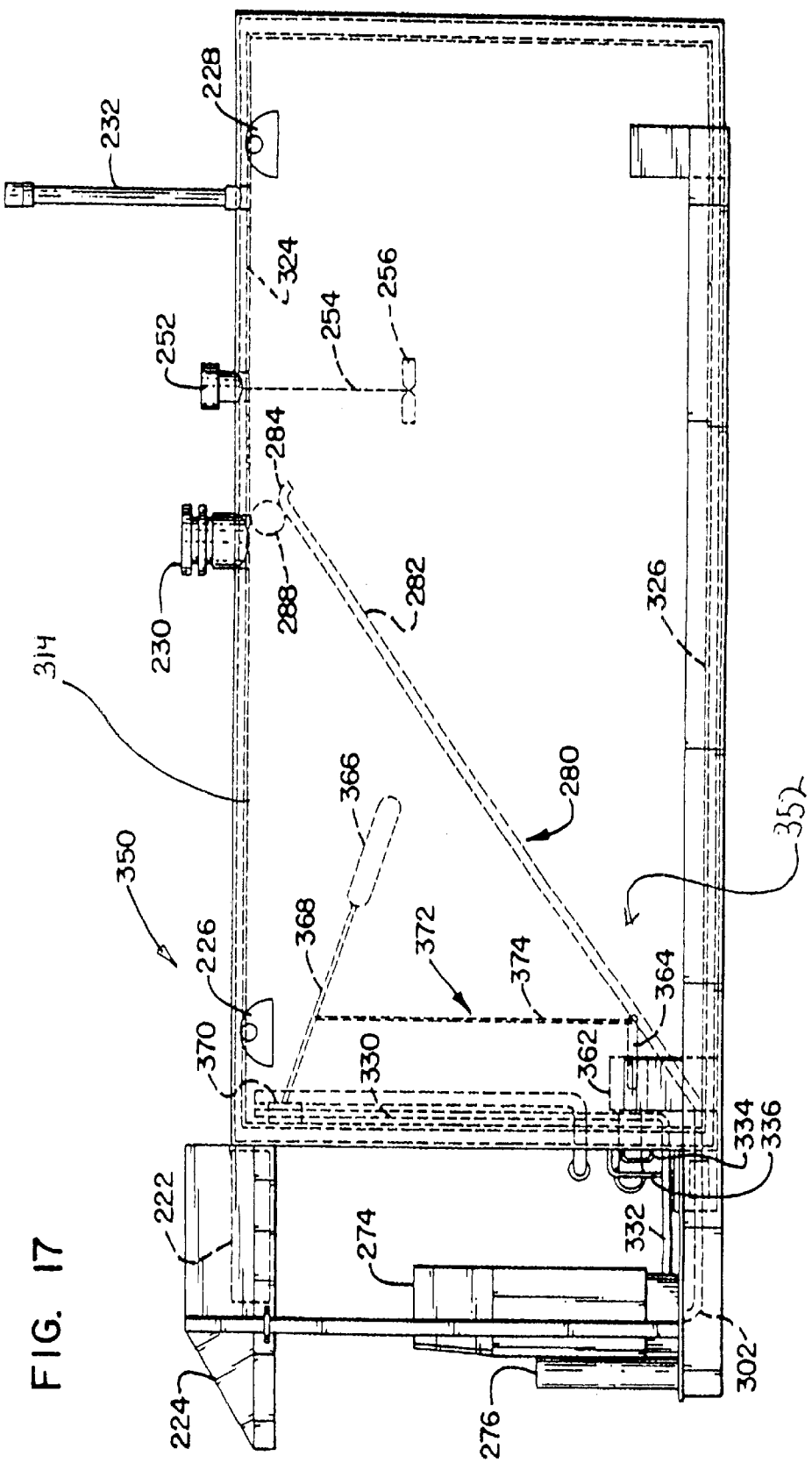

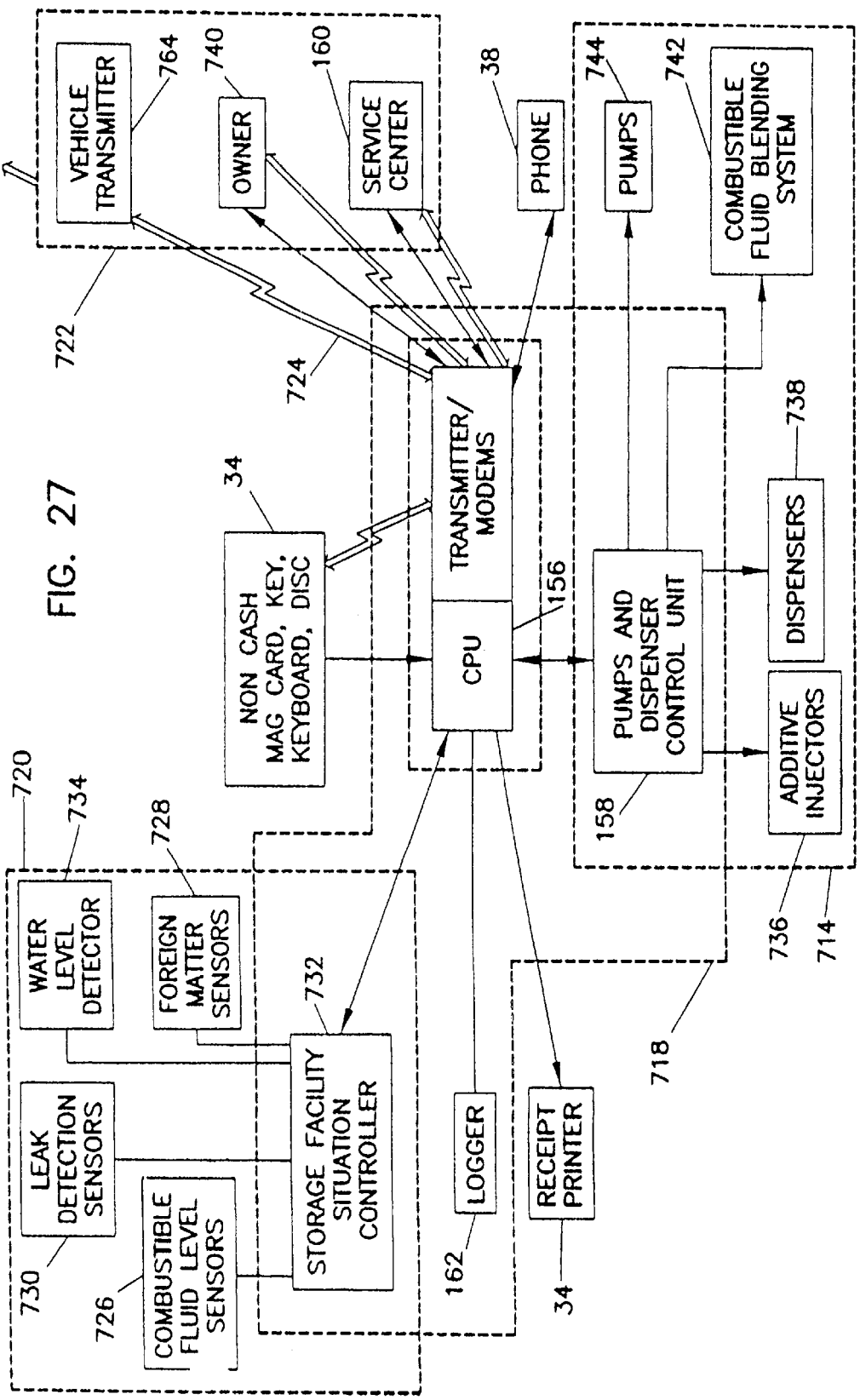

METHOD FOR DISPENSING FUEL

This is a continuation of Ser. No. 09/457,544 filed Apr. 9, 1998, which is a continuation of Ser. No. 09/032,187, filed Feb. 27, 1998 is now U.S. Pat. No. 6,039,123, which is a continuation of Ser. No. 08/720,806, filed on Oct. 1, 1996 is now U.S. Pat. No. 5,950,872, which is a Continuation-In-Part of Ser. No. 08/215,224 filed on Mar. 21, 1994 is now U.S. Pat. No. 5,562,162, which is a continuation of Ser. No. 08/194,751, filed Feb. 10, 1994 now abandoned, which is a continuation of Ser. No. 07/760,747, filed on Sep. 16, 1991 and now abandoned, which is a continuation-in-part of Ser. No. 07/607,567, filed on Nov. 1, 1990 and now U.S. Pat. No. 5,305,926, which in turn is a continuation-in-part of Ser. No. 07/332,462, now U.S. Pat. No. 4,988,020, which was filed Mar. 30, 1989. The disclosures of all of the above-referenced documents are hereby incorporated into this document as if set forth fully herein.

BACKGROUND OF THE INVENTION

1. Field of the Invention

The present invention relates to an improved portable fueling facility of the type that may be deployed at an airport or other desired refueling location. More specifically, the invention relates to an improved fueling facility which has improved secondary containment characteristics, is easily deployable at a desired location and that does not need an attendant to effect a refueling transaction.

2. Description of the Prior Art and Related Technology

Nearly all modern airports have facilities of some type for refueling. The most prevalent type of aircraft refueling facility includes a belowground storage tank and an aboveground pumping module which are operated by an attendant, much in the manner of commercial service stations for automobiles.

One significant disadvantage of such in-ground refueling stations is the time and labor involved in preparing for and constructing such a facility. Some factors that contribute to the expense of constructing a belowground facility include the need for construction permits, subcontractors, excavation and the time and planning involved in locating a permanent site for the facility. Once installed, such facilities cannot practically be moved to different locations at the airport, to other airports, or be sold.

In recent years, some aboveground refueling facilities have become commercially available. One example is the Edghill Airfield fueling installation, which is commercially available from H. W. Edghill Equipment, of Basing Stoke, Hampshire, England. This facility includes a pair of tanks that are manifolded together and are mounted on a hard surface by a skid. A remotely positioned electrically powered dispensing unit is provided to dispense the fuel. However, this dispensing unit also requires the presence of an attendant to monitor the refueling transaction and has limited safeguards to prevent leaks and spills.

In many small airports throughout the United States and the world, it is difficult for a pilot to refuel his or her aircraft at irregular times when an attendant is not present at the airport's refueling facility. As a result, a pilot may be effectively prevented from beginning or resuming a flight until an attendant is again on duty.

In addition, many commercial service stations for automobiles have limited operational hours. When an attendant is not on duty at such stations, a traveler cannot refuel his vehicle.

Another problem with existing aboveground fuel storage facilities is the possibility of catastrophic fire or explosion if surrounding objects catch on fire.

When storing volatile liquids such as fuel, it is important that the loss of vapor to atmosphere be minimized, both for fuel conservation and ecological considerations.

When refilling a fueling facility, it is also important that the operator in charge of such refilling be warned when the fuel level in the storage tank approaches capacity.

It is clear there has existed a long and unfilled need in the prior art for a portable aboveground refueling facility for refueling aircraft or ground vehicles which has adequate protection against fuel leakage, is readily deployable at a desired refueling location and does not require an attendant to effect a refueling transaction.

SUMMARY OF THE INVENTION

Accordingly, it is an object of the invention to provide an improved portable aircraft refueling facility which is effective at preventing unwanted fuel leakage, is readily deployable at a desired location and which does not require an attendant to effect a refueling transaction.

It is further an object to provide an aboveground fueling facility that is insulated against fire or extreme temperature conditions.

It is yet further an object of the invention to provide a portable aircraft refueling facility that provides clean fuel for pumping.

It is yet further an object of the invention to provide an improved portable fueling facility having a system for automatically preventing dangerous overfilling of its storage tank.

It is further an object of the invention to provide an improved portable refueling facility in which fuel is loaded and unloaded with a minimum of spillage.

It is also an object of the invention to provide an improved portable refueling facility which is capable of preventing vapor loss to atmosphere, especially when the facility is warn or filled to capacity.

It is further an object of the invention to provide an improved portable refueling facility which provides a warning to a fill operator during refilling when fuel in the storage tank of the facility approaches the capacity of the storage tank.

It is further an object of the invention to provide a portable refueling assembly that has a system for suppressing combustion within a storage tank if and when such combustion occurs.

In order to achieve these and other objects of the invention, an improved aboveground system for storing a combustible fluid such as gasoline includes a storage tank that is constructed and arranged to store a combustible fluid such as gasoline, the storage tank having a wall that has inner and outer surfaces; an outer tank surrounding the inner tank so as to provide secondary containment for the fluid that is stored in the storage tank, the outer tank having a wall that has inner and outer surfaces, wherein an interstitial space is defined between the inner surface of the outer tank and the outer surface of the storage tank; and a pipe for communicating with the storage tank, the pipe extending through the wall of the storage tank, into the interstitial space and through the interstitial space for a distance so as to extend substantially parallel to at least one of the walls of the outer tank and the storage tank, and then through the wall of the outer tank, whereby fluid may be supplied to or withdrawn from the storage tank.

According to a second aspect of the invention, an improved aboveground system for storing a combustible fluid such as gasoline includes a storage tank that is constructed and arranged to store a combustible fluid such as gasoline, the storage tank having a wall that has inner and outer surfaces; an outer tank surrounding the inner tank so as to provide secondary containment for the fluid that is stored in the storage tank, the outer tank having a wall that has inner and outer surfaces, wherein an interstitial space is defined between the inner surface of the outer tank and the outer surface of the storage tank; a pipe for communicating with the storage tank, the pipe extending through the wall of the storage tank, into the interstitial space and through the interstitial space for a distance so as to extend substantially parallel to at least one of the walls of the outer tank and the storage tank, and then through the wall of the outer tank, whereby fluid may be supplied to or withdrawn from the storage tank; and access means for gaining access through the wall of the outer tank to the portion of the pipe that extends through the interstitial space for a distance so as to extend substantially parallel to at least one of the walls of the outer tank and the storage tank.

According to a third aspect of the invention, an improved aboveground heat emergency-resistant system for storing a combustible fluid such as gasoline includes a storage tank that is constructed and arranged to store a combustible fluid such as gasoline, the storage tank having a wall that has inner and outer surfaces; an outer tank surrounding the inner tank so as to provide secondary containment for the fluid that is stored in the storage tank, the outer tank having a wall that has inner and outer surfaces, wherein an interstitial space is defined between the inner surface of the outer tank and the outer surface of the storage tank; and a vent for relieving pressure from the interstitial space.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 is a diagrammatical view illustrating operation of a hose retractor mechanism in an apparatus constructed according to the embodiments of FIGS. 1 and 2;

FIG. 6 is a cutaway view of the deck compartment illustrated in the embodiments of FIGS. 1–5;

FIG. 7 is an enlarged fragmentary view of the leak detection gauge depicted in FIG. 1;

FIG. 17 is a longitudinal cross-sectional view through a portable fueling facility constructed according to a third embodiment of the invention;

FIG. 27 is a schematic representation of a control system of the embodiment of the invention that is depicted in FIG. 26.

DETAILED DESCRIPTION OF THE PREFERRED EMBODIMENT(S)

Figure 1:
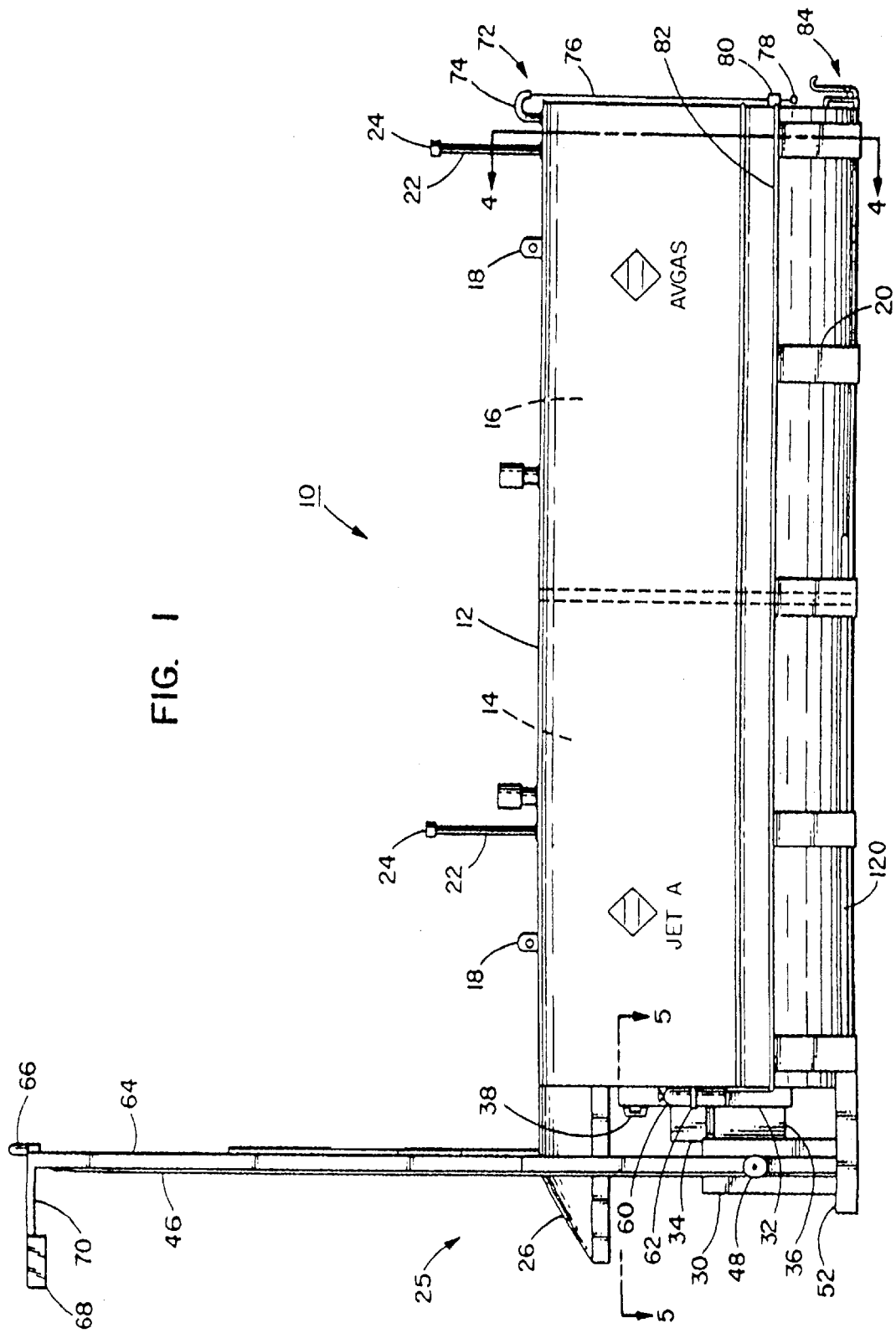
FIG. 1 is a side elevational view of a portable refueling facility constructed according to a preferred embodiment of the invention.

Referring now to the drawings, wherein like reference numerals designate corresponding structure throughout the views, and in particular referring to FIG. 1, an improved refueling facility 10 includes an outer tank 12, a front inner storage tank 14 and a rear inner storage tank 16. The front and rear storage tanks 14, 16 are both disposed within outer tank 12, which provides secondary containment about both inner storage tanks 14, 16 in order to provide effective detection and prevention of leakage from the inner tanks 14, 16. A pair of lifting lugs 18 are provided on an upper surface of outer tank 12 in order to permit the facility 10 to be moved via a crane or like lifting device to a desired location. The facility 10 and, more specifically, outer tank 12 is supported relative to a flat' horizontal surface such as concrete platform or a paved surface by a plurality of saddle members 20, each of which have a flat lower surface and a concave upper surface which receives a lower portion of outer tank 12. As is illustrated in FIG. 1, both the front storage tank 14 and the rear storage tank 16 are in communication with a respective vent pipe 22 which has a valve 24 mounted at a second end thereof. Valve 24 is constructed to allow air or vapors to flow into and out of the respective tank 14, 16. However, valve 24 acts as a check valve to minimize fuel vapors from leaving vent pipe 22 during refilling or expansion. This is accomplished by a spring actuator within valve 24 which causes the valve to seat until pressure or a vacuum builds up in the tank 14, 16.

Figure 2:
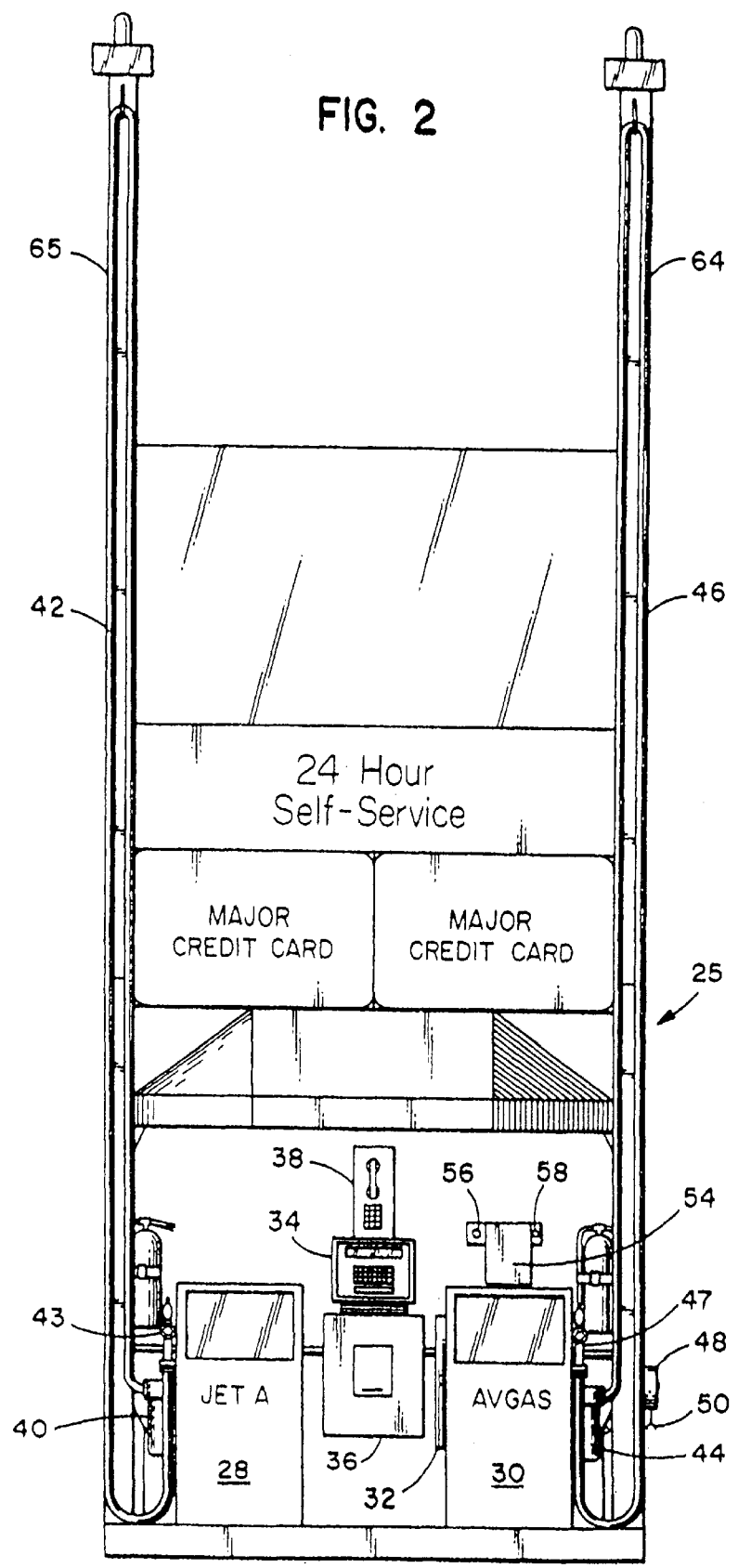
FIG. 2 is a front elevational view of the facility depicted in FIG. 1.
Figure 4:
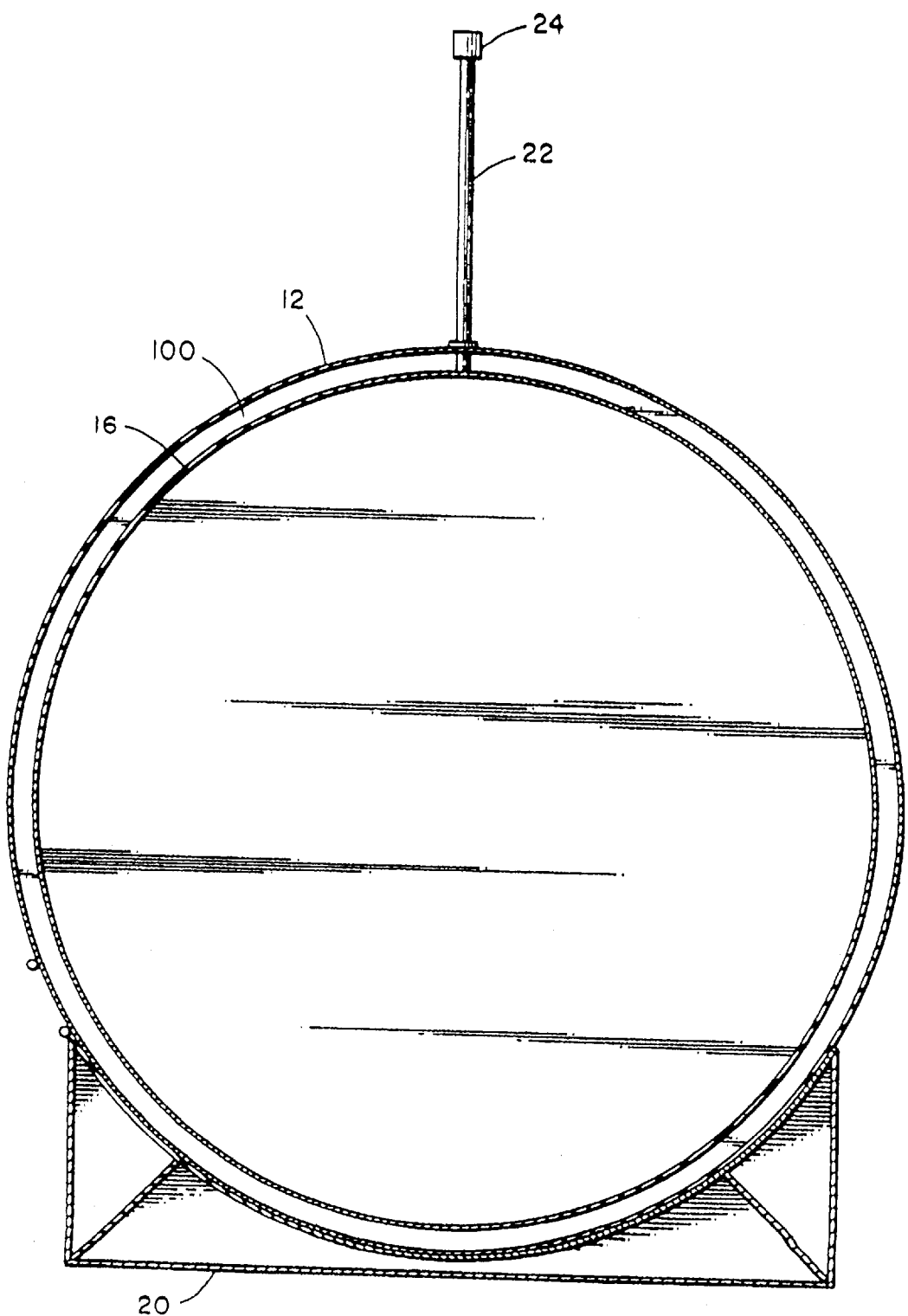
FIG. 4 is a cross-sectional view taken along lines 4—4 in FIG. 1.

Referring briefly to FIG. 2, facility 10 includes a fueling station 25 that has a protective canopy 26, a first pump 28 and a second pump 30 that are beneath the canopy 26. In the illustrated embodiment, first pump 28 is dedicated to the front storage tank 14 and is used to dispense jet A fuel, while second pump 30 is dedicated to rear storage tank 13 and is used to dispense AVGAS. Operation of both pumps 28, 30 is controlled by means of a pump control unit 32 in a manner which will be described in greater detail below.

One attractive feature of a fueling facility constructed according to the invention is its capability to accommodate self-service refueling by accepting major commercial credit cards. To effect this capability, a credit card reader 34 is provided in fueling station 25. A receipt printer 36 is positioned beneath card reader 34 to provide a tangible verification of the refueling transaction to the pilot for his or her financial records. A telephone 38 is provided above card reader 34 in order to enable a pilot to communicate any inquiries or complaints to a central customer support facility.

In operation, first pump 28, when activated, will pump fuel from front storage tank 14 through a first filter unit 40 into a first hose 42 to a nozzle 43, which may be held by the pilot during the refueling process. Similarly, second pump 30, when activated, pumps fuel from rear storage tank 16 through a second filter unit 44 into a second hose 46 to a nozzle 47. Nozzle 47 may also be of the hand-held type, in which case an operator may hold the nozzle 47 during refueling. Alternatively, nozzle 43 may be of the type that is securable to the refueling port in an airplane. In this second case, the operator is required to depress a dead man switch 58 during the entire refueling process in order to permit operation of pump 28. In this way, refueling is disrupted should an unexpected emergency occur.

Before refueling, an operator will ground the aircraft by means of a cable attachment 50 that is unwindable from a grounding reel 48, as is shown in FIGS. 1 and 2. Grounding reel 48 is electrically connected to the frame of fueling facility 10. As a result, arcing between facility 10 and the aircraft due to differences in electrical potential therebetween is prevented.

Referring again to FIG. 1, it will be observed that pumps 28, 30 are mounted upon a deck compartment 52, the construction of which provides important advantages according to the invention. Deck compartment 52 defines a compartment or space therein through which the fuel lines between tanks 14, 16 and pumps 28, 30 respectively. pass. As a result, secondary containment is achieved beneath all pipe connections for the entire fueling facility 10.

Referring briefly to FIG. 2, fueling station 25 further includes an electrical panel 54 through which electrical lines for operating the pumps 28, 30, card reader 34, receipt printer 36 and pump control unit 32 are routed. An emergency shut-off switch 56 is provided adjacent electrical panel 54, as is the dead man switch 58 that has previously been discussed. A pair of fire extinguishers 60 are further mounted at fueling station 25 by a respective pair of clamps 62 as is shown in FIGS. 1 and 2.

Another novel aspect of the invention concerns a novel fueling hose retracting arrangement which includes a pair of retractor columns 64, 65 which are mounted at outer ends of fueling station 25 adjacent pumps 30, 28 respectively. Each retractor column 64 includes an aircraft warning light 66, an illumination source 68 and an arm 70 for supporting illumination source 68. The construction of the hose retracting arrangements within retractor columns 64, 65 is discussed in greater detail below.

In order to monitor the fuel level in rear storage tank 16, a tank gauge 72 includes a tape 76 which is attached to a float within tank 16 and extends from tank 16 to a position outside outer tank 12 through a gauge tape housing 74. Tape 76 is urged downwardly by a weight 78. By observing the position of weight 78, the fuel level within rear storage tank 16 can be determined. In addition, a leak detection gauge 84 is provided for measuring the amount of fluid that has collected in the interstitial space between tanks 14, 16 and the outer tank 12. The operation of leak detection gauge 84 will be discussed in greater detail below.

Referring now to FIG. 3, the specifics of the hose retractor arrangement that is positioned within both retractor columns 64, 65 will now be discussed. The retractor arrangement includes a first pulley 86 that is rotatably mounted to a retractor column 64. A swivel-type hose support bracket 88 is used to support a central portion of a respective one of the fueling hoses 42, 46, as is shown in FIG. 3. A second counterweight pulley is rotatably mounted to a connecting rod 94 by means of a device 92. Connecting rod 94 is in turn secured to a counterweight 96 which is of sufficient mass to exert a relatively strong downward force on counterweight pulley 90. A retractor cable 95 is secured to hose support bracket 88 at a first end thereof and has a second end which is secured to retractor column 64 by a cable tie-down member 98. Cable 95 stretches over the first and second pulleys 86, 90 in the manner illustrated in FIG. 3 so that the weight of counterweight 96 is transmitted to support bracket 88 in the form of an upward bias which causes the hose 46 to be withdrawn to a retracted position until a greater downward force is exerted thereon by an operator during the refueling process. It should be noted that the pulley arrangement described above and illustrated in FIG. 3 constitutes a force magnification linkage which applies twice the amount of upward force on hose 46 than is exerted downwardly by counterweight 96. The above-described retraction arrangement provides a smooth non-disruptive retraction force, which insures that the respective hoses 42, 46 will be withdrawn from an aircraft when an operator ceases to impart downward force to nozzles 43, 47, respectively.

Figure 5:
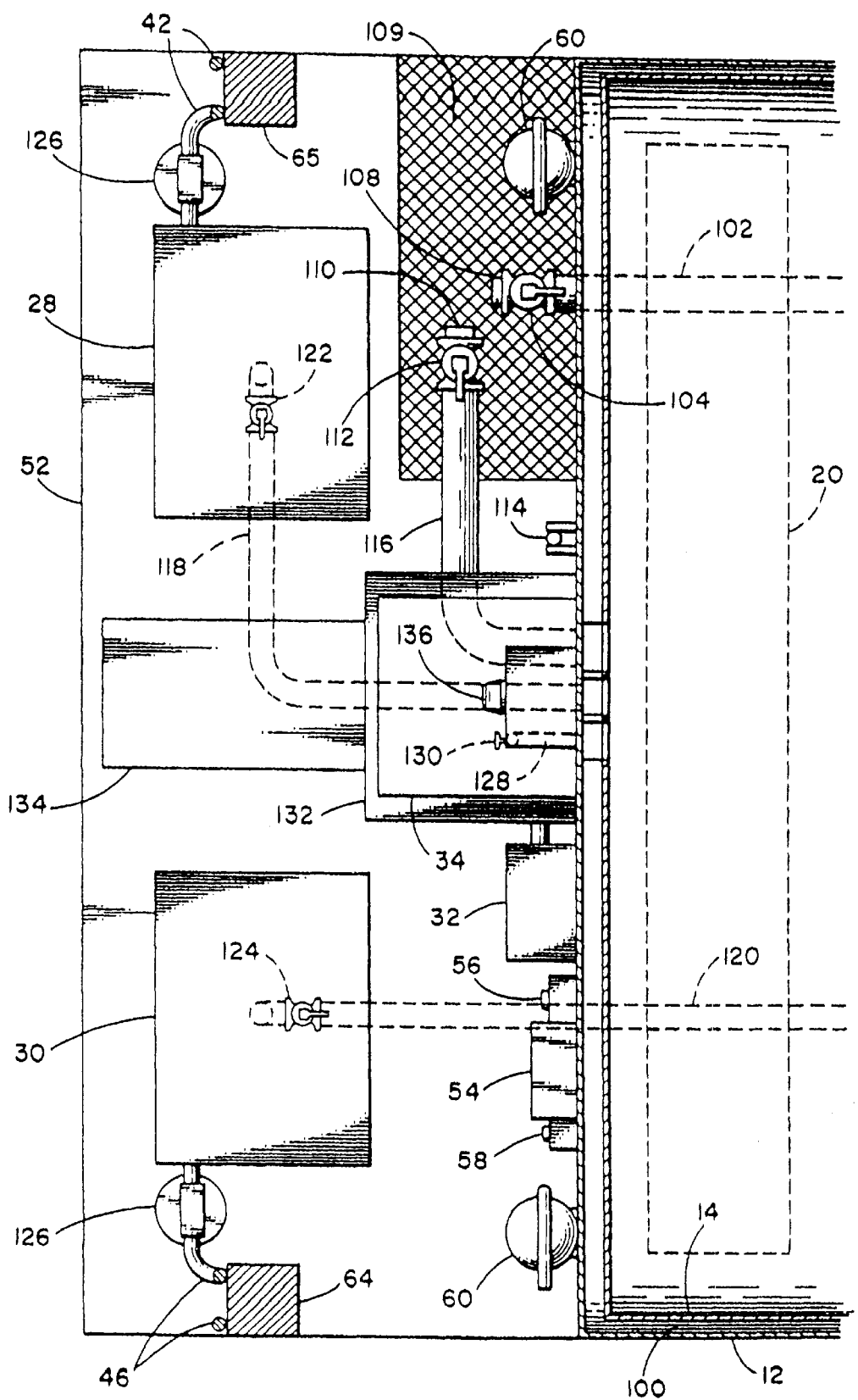
FIG. 5 is a fragmentary cross-sectional view taken along lines 5—5 in FIG. 1.

Referring now to FIG. 5, a fragmentary cross-sectional view looking down into an end portion of front storage tank 14 and deck compartment 52 depicts the interstitial space 100 which is defined between the front storage space 14 and outer tank 12. As is shown in FIG. 5, a rear tank fill tube 102 extends from the rear storage tank 16 to a nipple end 108. A gate valve 104 is interposed in fill tube 102 between rear tank 16 and nipple 108. When it is desired to refill rear tank 16, a source of fuel is connected to nipple 108 and gate valve 104 is opened, thereby permitting fuel to be pumped from the refueling source into rear tank 16 via fill tube 102. Similarly, a front tank fill tube 116 is provided in communication with front tank 14. Front tank fill tube 116 has a nipple end portion 110 and a gate valve 112 interposed between nipple portion 110 and the remainder thereof. When it is desired to refill front storage tank 14, an appropriate source of fuel is connected to nipple 110 and gate valve 112 is opened, thereby permitting fuel to be pumped into front storage tank 14.

As is shown in FIG. 5, both nipples 108, 110 are positioned above a grate 109 which permits fuel that is spilled during refilling to drop down into deck compartment 52. In this way, deck compartment 52 acts as a secondary containment for fuel spillage during refilling of tanks 14, 16.

In order to provide fuel from front storage tank 14, a front tank supply pipe 118 is connected to first pump 28, as is shown in FIG. 5. A valve 122 is provided within front tank supply pipe 118 in order to cut off the supply of fuel to first pump 28 during maintenance or in the event of an emergency. Similarly, a rear tank supply pipe 120 communicates rear tank 16 with second pump 30 and has a valve 124 interposed therein. Both pipe 118 and pipe 120 are routed through deck compartment 52 in order to provide secondary containment for fuel that is drawn therethrough.

Referring now to FIG. 6, a water draw off line 128 having a valve 130 interposed therein is provided for drawing water off a bottom portion of first tank 14 in a manner that is known to those skilled in the art. Rear tank 16 is provided with a similar water draw off arrangement, as will be discussed below. An inspection hatch 134 is provided in deck compartment 52 for providing access during maintenance, refilling or in an emergency. As is best shown in FIG. 6, deck compartment 52 includes an end wall 138, an upper wall 140 and a lower wall 142. These walls along with a pair of side walls (not shown) define a compartment or space which provides secondary containment for the rear tank fill tube 102, the front tank fill tube 116, and for spillage from the front tank supply pipe 118 and the rear tank supply pipe 120. As a result, the facility 10 provides a high degree of safety and protection from accidental spillage or combustion due to fuel linkage.

Referring now to FIG. 7, leak detection gauge 84 will now be discussed. Leak detection gauge 84 includes a transparent gauge tube 144 that is in communication with the interstitial space between second tank 16 and outer tank 12. Gauge tube 144 has measuring indicia 146 provided thereon for accurately measuring the level of fluid within gauge tube 144. A drain tube 148 extends downwardly from gauge tube 144 and has a valve 150 provided therein. As a result, leak detection gauge 84 can also be used to drain unwanted fluid from within the interstitial space 100. Also depicted in FIG. 7 is the water draw off line 152 that is provided for the rear tank 16. Line 152 has a valve 154 interposed therein and functions in a manner which is known to those skilled in the art.

Figure 8:
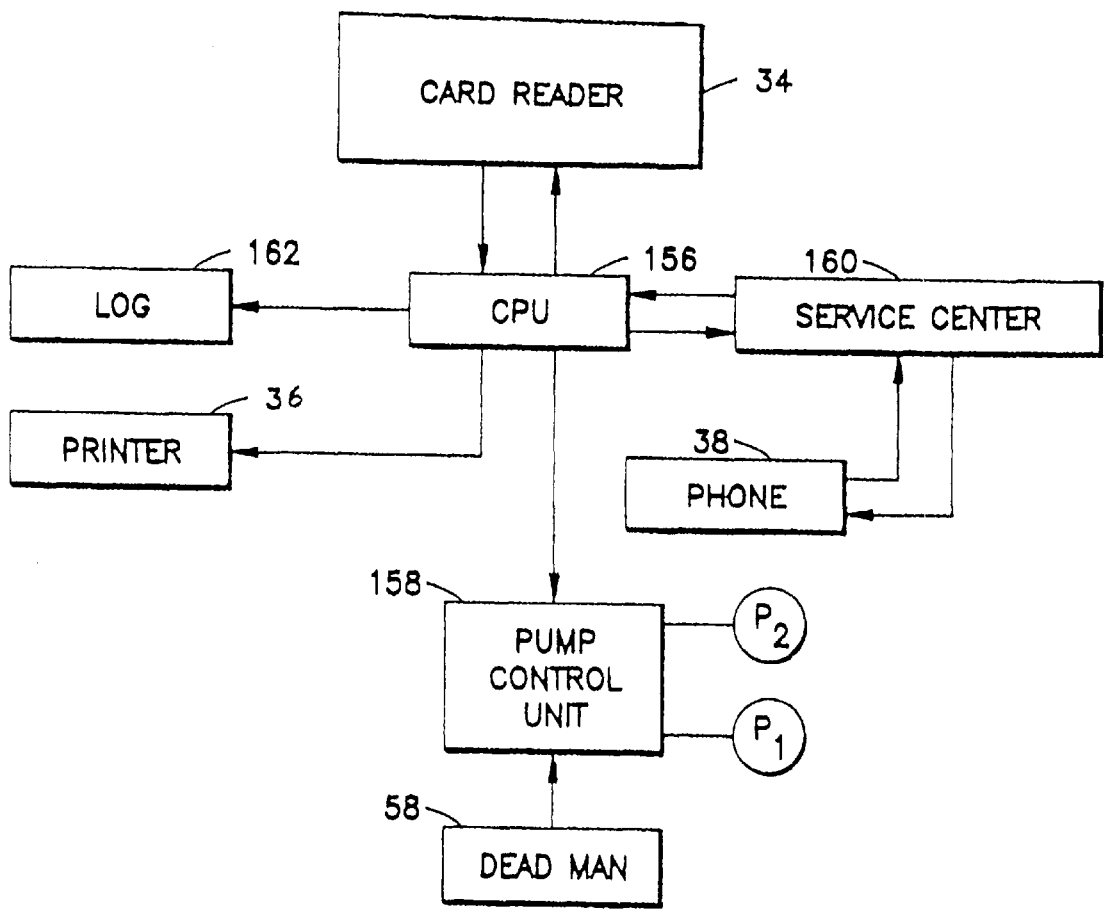
FIG. 8 is a schematic block diagram of a system that is used to control a refueling facility constructed according to the embodiment of FIGS. 1–7.

Referring now to FIG. 8, a system for controlling the first and second pumps 28, 30, which are labeled as P1 and P2, respectively for purposes of FIG. 8 will now be described. As is depicted in FIG. 8, card reader 34 is in communication with a central processing unit 156. Central processing unit 156 is arranged to instruct a pump control unit 158 when it is permissible to actuate one of the pumps P1, P2. A remote service center 160 can monitor and/or instruct CPU 156 on one or any refueling transactions that take place. Service center 160 is further in two-way voice communication with telephone 38. All transactions that occur at the improved facility 10 are recorded in a log 162, which is provided with information from the central processing unit 156. Receipt printer 34 is also given instructions by the central processing unit 156. Pump control unit 158 may further be responsive to the input of dead man switch 58 in the manner that is described above.

Figure 9:
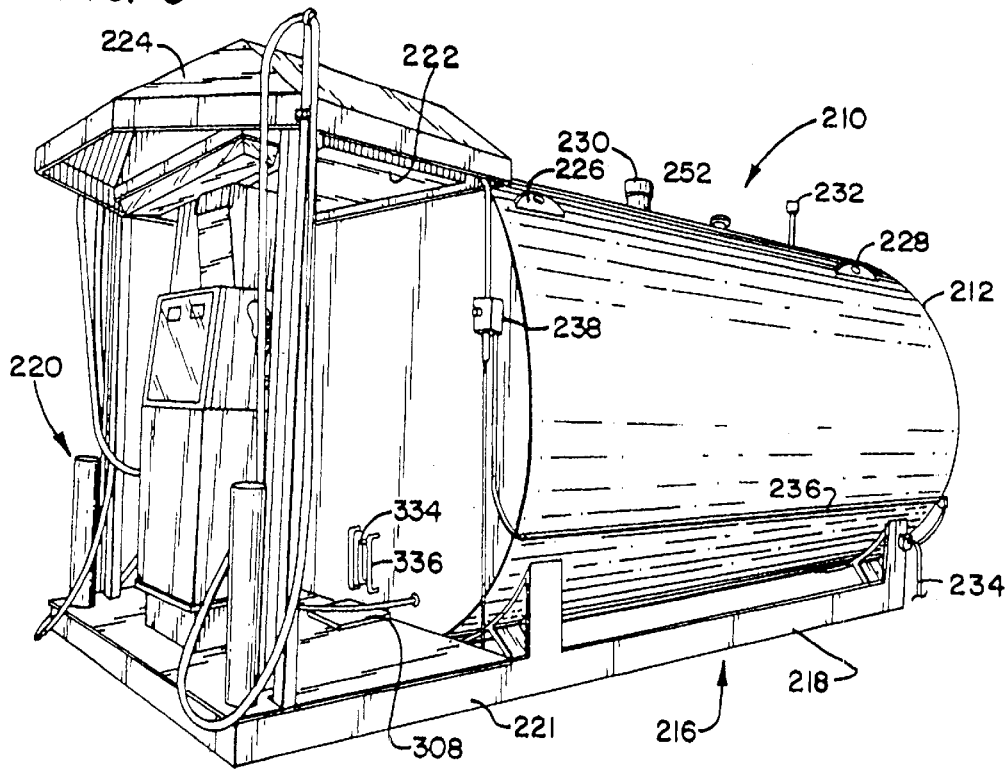
FIG. 9 is a perspective view of a portable fueling facility constructed according to a second embodiment of the invention.
Figure 10:
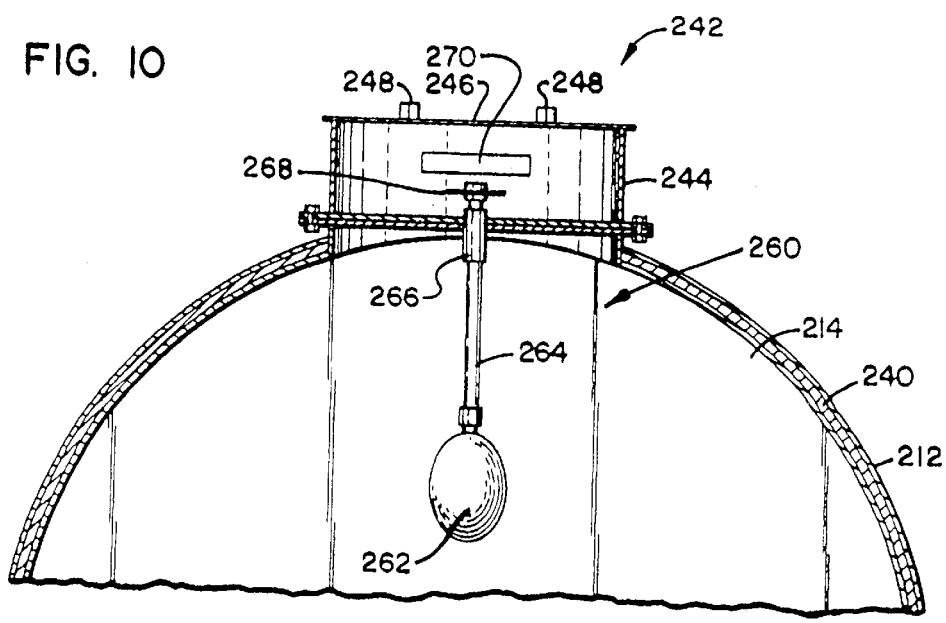
FIG. 10 is a fragmentary cross-sectional view of a component in the embodiment of FIG. 9.

An improved portable fueling facility 210 constructed according to a second embodiment of the invention is depicted in FIGS. 9–16. Referring to FIG. 9, fueling facility 210 includes an outer tank 212 that is constructed to surround a storage tank 214. Structure 216 including a saddle member 218 is provided for supporting the outer tank 212, as may be seen in FIG. 9. A pump assembly 220 is provided on top of a deck compartment 221, in the manner described above with reference to the previous embodiment. A fire suppression system 222 is contained in a hood 224 that is attached to outer tank 212 and extends above pump assembly 220. The fire suppression system 222 is commercially obtainable from ADX as Series 9000 Dry Chemical Spot Protection System.

Referring again to FIG. 9, facility 210 includes at least two lugs 226, 228 that are provided on an upper surface of outer tank 212. Lugs 226, 228 are adapted to be engaged by a crane or similar device for locating the facility 210 in a desired location. An emergency vent 230 is further provided on an upper surface of outer tank 212, and is in communication with storage tank 214, as may be seen in FIG. 11. Emergency vent 230 is of known construction, and is designed to allow vapor to escape and safely burn off in the vent of a catastrophic fire or other emergency. A pressure/vacuum vent 232 is also provided on an upper surface of outer tank 212 so as to be in communication with storage tank 214. Vent 232 is designed to open when subjected to more than eight (8) ounces per square inch of positive pressure or one-half ounce per square inch of negative pressure, thereby allowing storage tank 214 to breathe without allowing vapor therein to escape during normal operating conditions. Vent 232 is of known construction.

Facility 210 is connected to a power source 234 via an electrical cable 236 that is routed through an emergency cutoff switch 238. The electrical system for facility 210 is similar to that described above with reference to the previous embodiment.

One novel aspect of facility 210 is the provision of insulation material 240 and the interstitial space that exists between outer tank 212 and storage tank 214. Preferably, insulation material 240 is Kaowall 2300 ceramic fiber blanket, but it may alternatively be formed of similar fire-retardant materials. During normal operating conditions, insulation material 240 protects tank 214 against external temperature conditions that could otherwise cause fuel therein to expand or contract. In the event of a fire, insulation material 240 retards transmission of heat to storage tank 214, thereby providing extra time that could be used to extinguish the fire or to escape from its vicinity.

Referring now to FIGS. 10–13, the fueling facility 210 is provided with a receptacle 242 that is mounted to the upper surface of outer tank 212. Receptacle 242 is in the preferred embodiment formed by a single cylindrical side wall 244 which is sealed at a bottom edge to the upper surface of outer tank 212 by welding or a similar process. The upper edge of side wall 244 defines an opening which is selectively exposed or closed by a lid 246, which is pivotally secured to side wall 244 by means of a hinge 248.

Figure 11:
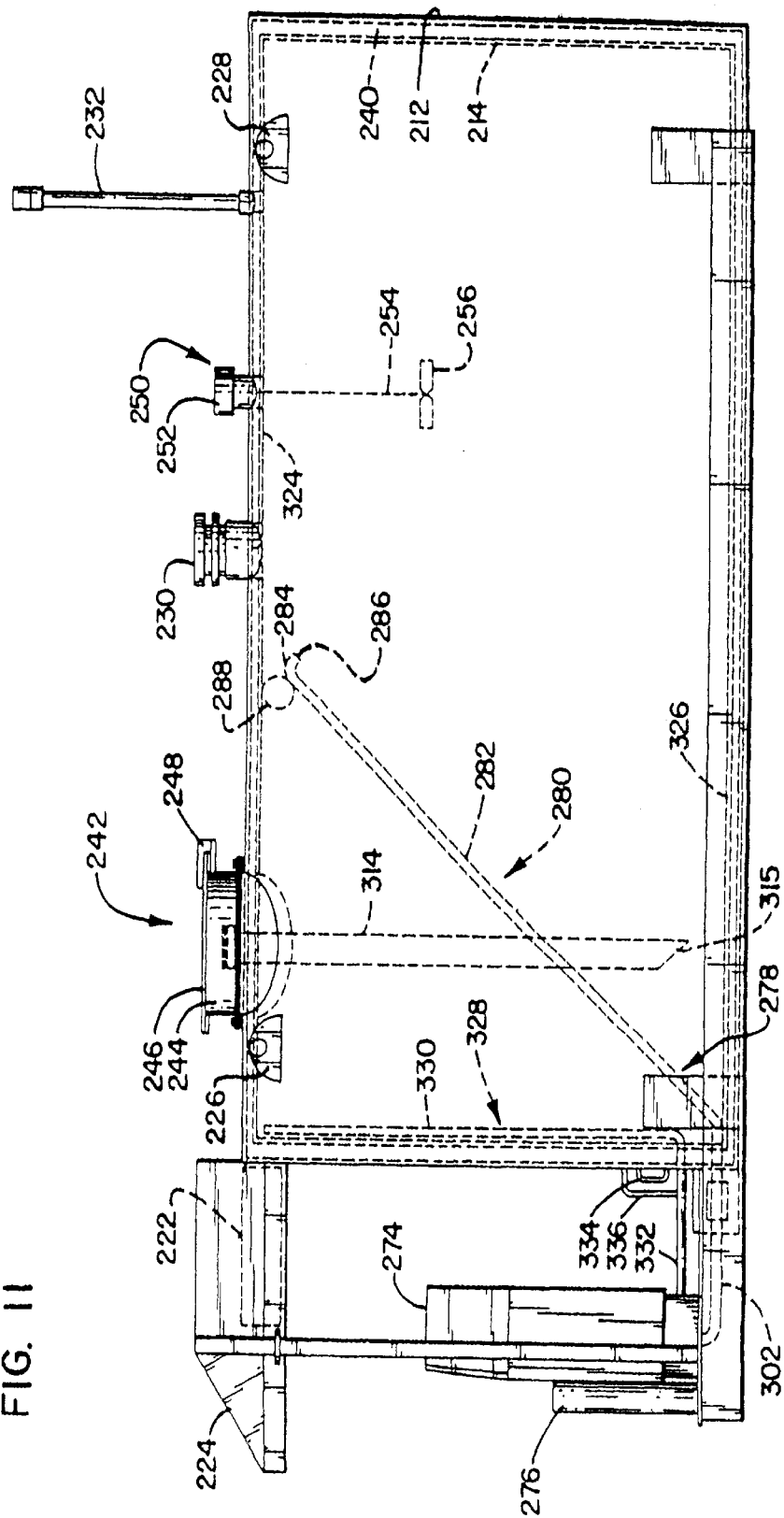
FIG. 11 is a longitudinal cross-sectional view through the embodiment of FIGS. 9 and 10.
Figure 12:
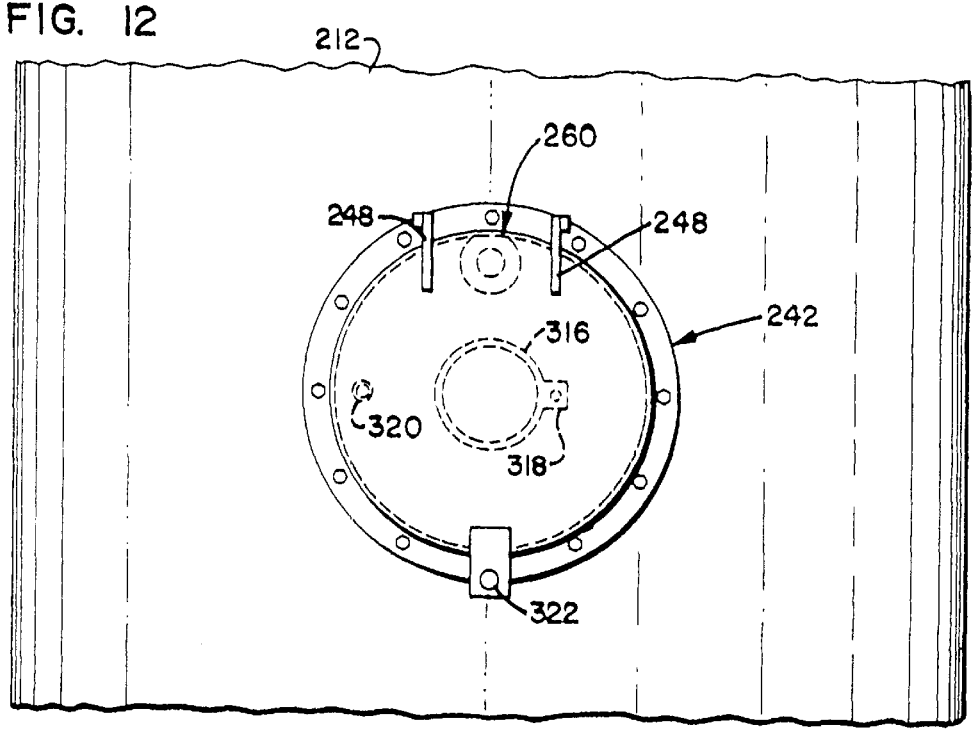
FIG. 12 is a fragmentary top plan view of a component in the embodiment of FIGS. 9–11.

Referring to FIG. 11, a gauge 250 for measuring the volume of fuel in storage tank 214 is provided on a top surface of outer tank 212. Volume gauge 250 includes a gauge body 252 from which a cable 254 supporting a float 256 within storage tank 214 is supported. An optical readout on gauge body 252 indicates the amount of cable 254 that has been played out, thereby determining the volume of fuel within storage tank 214. The readout itself is calibrated in terms of volume, rather than the length of cable that has been played out. Gauge 250 is commercially available from Scully Gage Company, as Model 3100.

Figure 13:
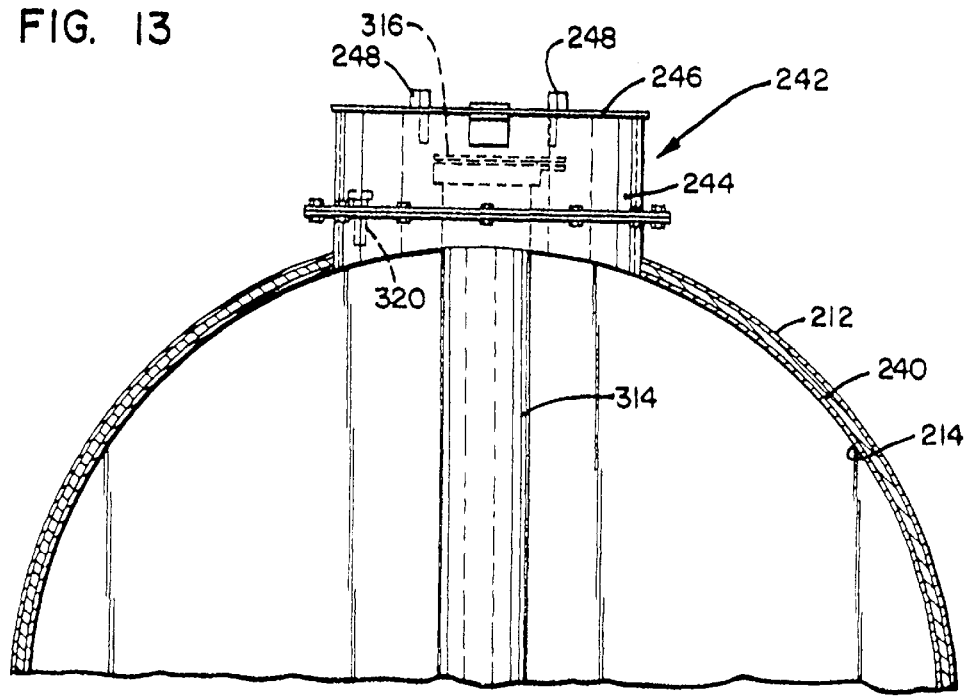
FIG. 13 is a fragmentary cross-sectional view through a component in the embodiment of FIGS. 9–12.
Figure 14:
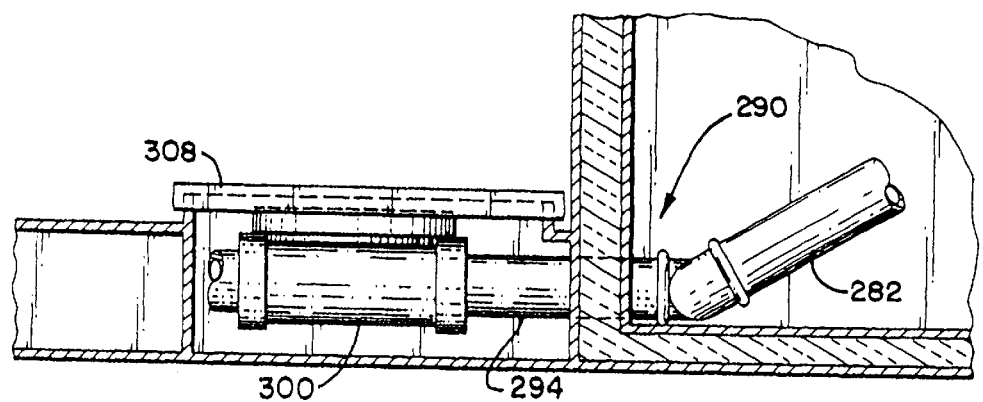
FIG. 14 is a fragmentary cross section through another component in the embodiment of FIGS. 9–13.

Referring to FIG. 13, a drain tube 320 is provided between the space defined within receptacle 242 and the space within storage tank 214 for allowing fuel spilled in receptacle 242 to drain into storage tank 214. A fill indicating-assembly 260 is also provided within receptacle 242. Fill indicating assembly 260 includes a float member 262, which is preferably copper-coated, a rod 264 and a sleeve 266 which communicates the space within receptacle 242 with the space within storage tank 214. Rod 264 is slidingly mounted within sleeve 266 and has an indicator disk 268 on an end thereof which extends into receptacle 242. Indicia 270 are provided on an inner surface of side wall 244. By viewing the position of disk 268 relative to indicia 270, an operator can determine when storage tank 214 has been filled to its predetermined maximum safe capacity.

A fill pipe 314 is also provided within receptacle 242. Fill pipe 314 communicates the space within receptacle 242 to a lower portion of storage tank 214, where fill pipe 314 terminates in a beveled end 315. The end of fill pipe 314 which extends into receptacle 242 is covered by a fill cap 316 that is attached to fill pipe 314 and opens by unscrewing lockable cover 318.

As may be seen in FIG. 11, pump assembly 220 includes a pump 274 and a pair of bumpers 276 that are provided on deck compartment 221 to protect pump 274 from accidental contact with a vehicle.

Facility 210 further includes a novel supply pipe structure 278 which includes an intake conduit 280 consisting of a rigid pipe 282 having an elbow portion 284 in which a fuel intake orifice 286 is defined. A float member 288 is mounted on an opposite side of elbow portion 284 from intake orifice 286. Rigid pipe 282 is pivotally supported at its lower end by a pivotal mounting structure 290, as may be seen in FIG. 14. Accordingly, as the level of fuel in storage tank 214 changes, float member 288 maintains the elbow portion 284 and thus orifice 286 at a position that is slightly beneath the upper surface of the fuel within tank 214. As a result, fuel which is drawn into intake conduit 280 is kept as free as possible from sediment, which tends to collect at the bottom inside surface 326 of storage tank 214.

Referring again to FIGS. 14 and 15, mounting structure 290 in its preferred embodiment is constructed from a first pipe elbow 292 which is connected at one end to a pump supply pipe 294. A second pipe elbow 296 is connected at one end to rigid pipe 282. A pipe nipple 298 is provided between second ends of the first and second pipe elbows 292, 296. Pipe nipple 298 may be threaded with respect to the elbows 292, 296 so as to allow relative rotation therebetween, or may be sealed with respect thereto in alternative manner.

Figure 15:
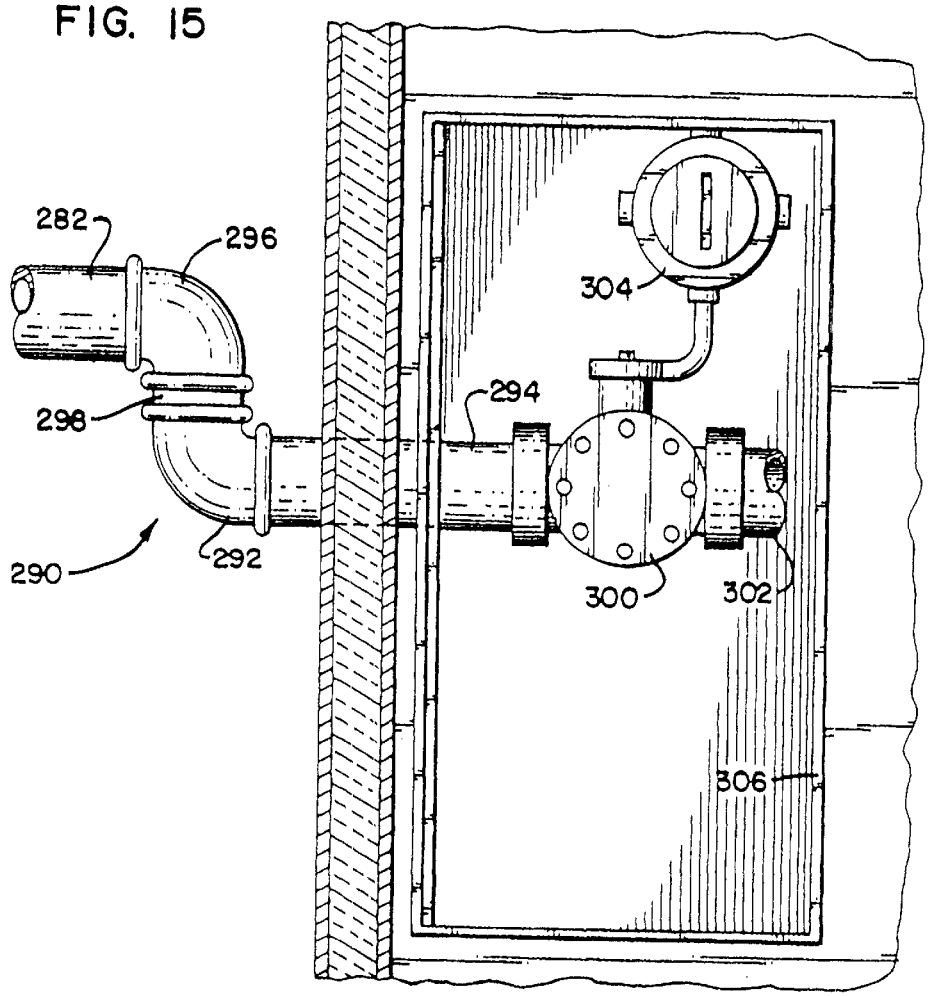
FIG. 15 is a cutaway fragmentary view of a component in the embodiment of FIGS. 9–14.
Figure 16:
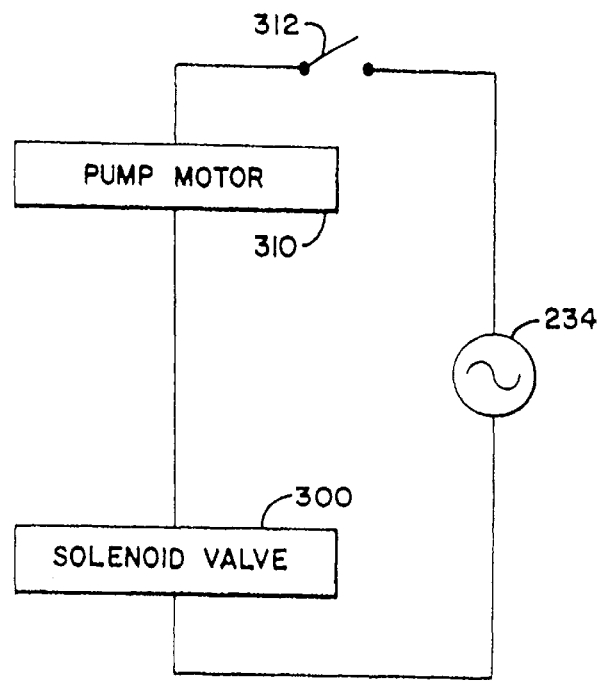
FIG. 16 is a schematic of a valve control circuit in the embodiment of FIGS. 9–15.

As may be seen in FIG. 15, a solenoid-controlled valve 300 is interposed between pump supply pipe 294 and a pipe 302 that leads to pump 274. Electrical connections to solenoid valve 300 are made through a sealed electrical junction box 304, which is provided within a deck compartment 221, as may be seen in FIGS. 14 and 15. A valve access cover 308 is provided on an upper surface of deck compartment 221 to provide access to valve containment box 306.

Solenoid valve 300 is constructed so as to be closed until it is electrically actuated to assume an open position. As may be seen schematically in FIG. 16, solenoid valve 300 is wired in series with a pump motor 310 within pump 274. When a switch 312 in pump 274 is actuated by an operator to its closed position, power from power source 234 flows through pump motor 310 and solenoid valve 300, thereby allowing fuel from intake conduit 280 to flow from storage tank 214 to the pump 274.

To refuel facility 210, an operator will undo the latch 322 and pivot lid 246 on its hinges 248 to an open position, in order to expose the fill pipe 314 within receptacle 242. The cap 316 is then removed from the top of fill pipe 314 by unscrewing it. A hose from a refueling truck is then connected to fill pipe 314 in a conventional manner. If, during refueling, fuel should spill into receptacle 242, it will drain into storage tank 214 via drain tube 320. During refueling, an operator monitors the position disk 268 relative to the indicia 270 that are provided on side wall 244. When disk 268 reaches the indicated maximum fill position, the refueling hose is disconnected from pipe 314, and cap, 316 is closed. The lid 246 of receptacle 242 is then closed and locked by latch 322. During normal operation of the facility 210, fuel is dispensed via pump 274 through the intake conduit 280, which continuously adjusts its position to compensate for the changing level of fuel within storage tank 214. In the event of a fire or other emergency, fire suppression system 222 will act to automatically suppress fires in the vicinity of pump 274. The insulation material 240 will protect the fuel and storage tank 214 in order to provide time for the fire to be extinguished. During normal operation, an operator may check to see whether any leakage has occurred from storage tank 214 by monitoring an interstitial gauge 334 which is constructed as a transparent tube and is in communication with the interstitial space between storage tank 214 and outer tank 212. A pair of guards 336 are provided to protect the interstitial gauge 334.

When fuel is dispensed by pump 274 to a vehicle, a stage II recovery circuit 328 ensures that fuel vapor that is displaced from the tank of the vehicle will be recovered. Pump 274 is constructed so as to be able to recover such vapor from the tank, in a manner that is known in the art. An external vapor line 332 connects pump 274 to an internal vapor line 330 that extends within storage tank 214. Internal vapor line 330 terminates in an orifice near the top inside surface 324 of storage tank 214. As fuel is forced into the tank of a vehicle by pump 274, the vapor is displaced from the vehicle into the external vapor line 332 from where it passes into internal vapor line 330 to be emitted above the upper surface of the fuel in storage tank 214.

A fueling facility 350 constructed according to a third embodiment of the invention is identical in all respects to facility 210 described in reference to FIGS. 9–16, except as specified hereinbelow. Facility 350 includes a bottom fill arrangement 352 which incorporates an external pipe 360 that is in communication with a valve body 362 provided within storage tank 314. External pipe 360 is provided with an adapter 354 which is connectable to a standard refueling vehicle, a check valve 356 which allows fuel to flow into tank 314 but prevents reverse flow and a gate valve 358. Referring to FIG. 17, valve 362 is constructed so as to be opened and closed by an actuator arm 364. A float member 366 is pivotally connected to a side wall portion of tank 314 by a pivot mount 370 via a rod 368. Rod 368 is connected to actuator arm 364 via a linking structure 372, which in the preferred embodiment is a rod 374. Valve 362 is constructed so as to be in an open position when actuator arm 362 is in a downward position, and is closed when actuator arm 364 is drawn upwardly to a predetermined limit.

Facility 350 further includes a stage I vapor recovery circuit 376 that consists of an internal vapor pipe 378 and an external pipe 380. Internal pipe 378 has an orifice that is positioned proximate the top inside surface 324 of tank 314. Internal pipe 378 extends from its upper orifice downwardly parallel to a side wall portion of tank 314 to a location where it exits tank 314 and communicates with external pipe 380.

Figure 18:
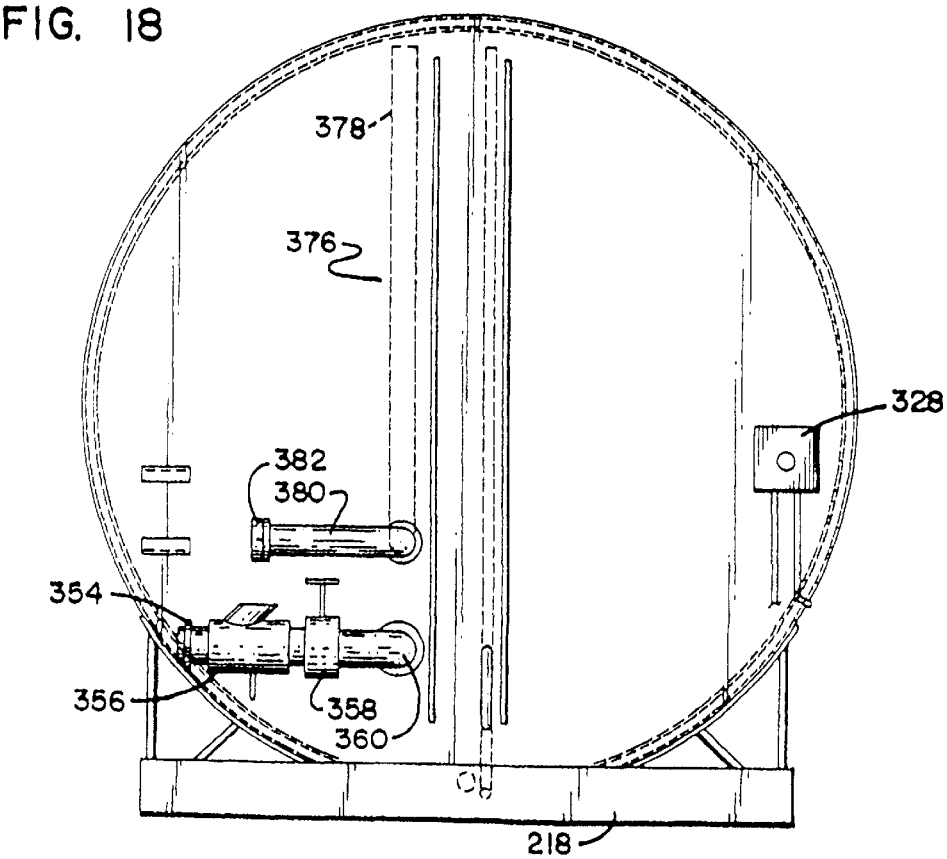
FIG. 18 is an elevational view of a portion of the system illustrated in FIG. 17.

A cap 382 is provided on the open end of external pipe 380, as may be seen in FIG. 18.

When it becomes necessary to refill tank 314, a hose from a refilling truck is connected to adapter 354, and gate valve 358 is opened. Fuel is then pumped into tank 314 via the external pipe 360, through the open valve 362. When the fuel within tank 314 reaches its predetermined maximum level, float member 366 will, via rod 368 and linking structure 372, pull actuator arm 364 to its predetermined upper limit, thereby closing valve 362. At this point, fuel is prevented from entering tank 314. One advantage of the bottom fill mechanism 352 is that the refilling process is automatically shut off without spilling fuel or over-pressuring tank 314. During such refueling, vapor that is displaced from tank 314 enters internal pipe 378 through its upper orifice, and passes through external pipe 380 to a second hose leading to the refueling truck. In this way, the displaced vapor is recovered in the refueling truck, and is not passed into the environment.

Figure 19:
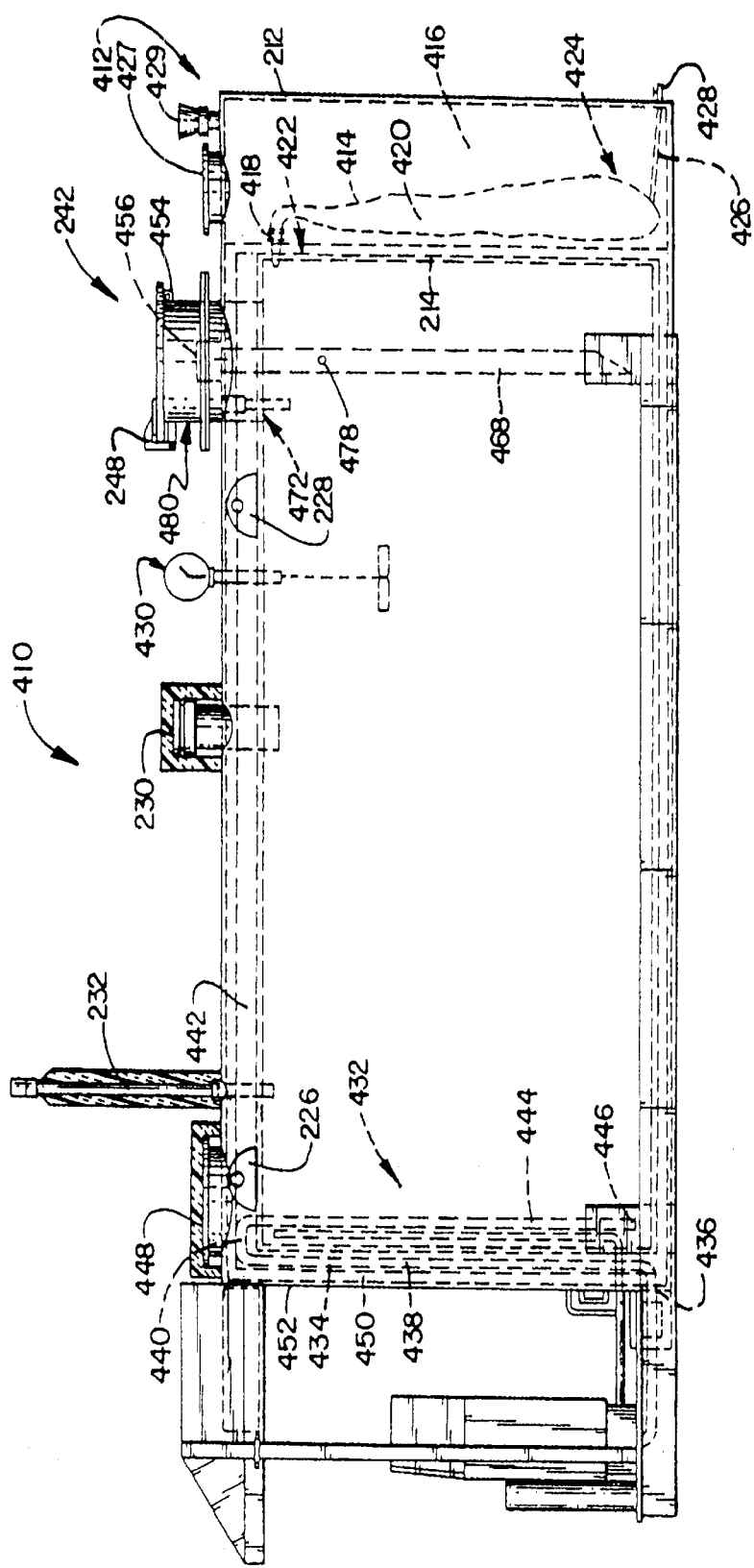
FIG. 19 is a side elevational view of a system constructed according to a fourth embodiment of the invention.
Figure 20:
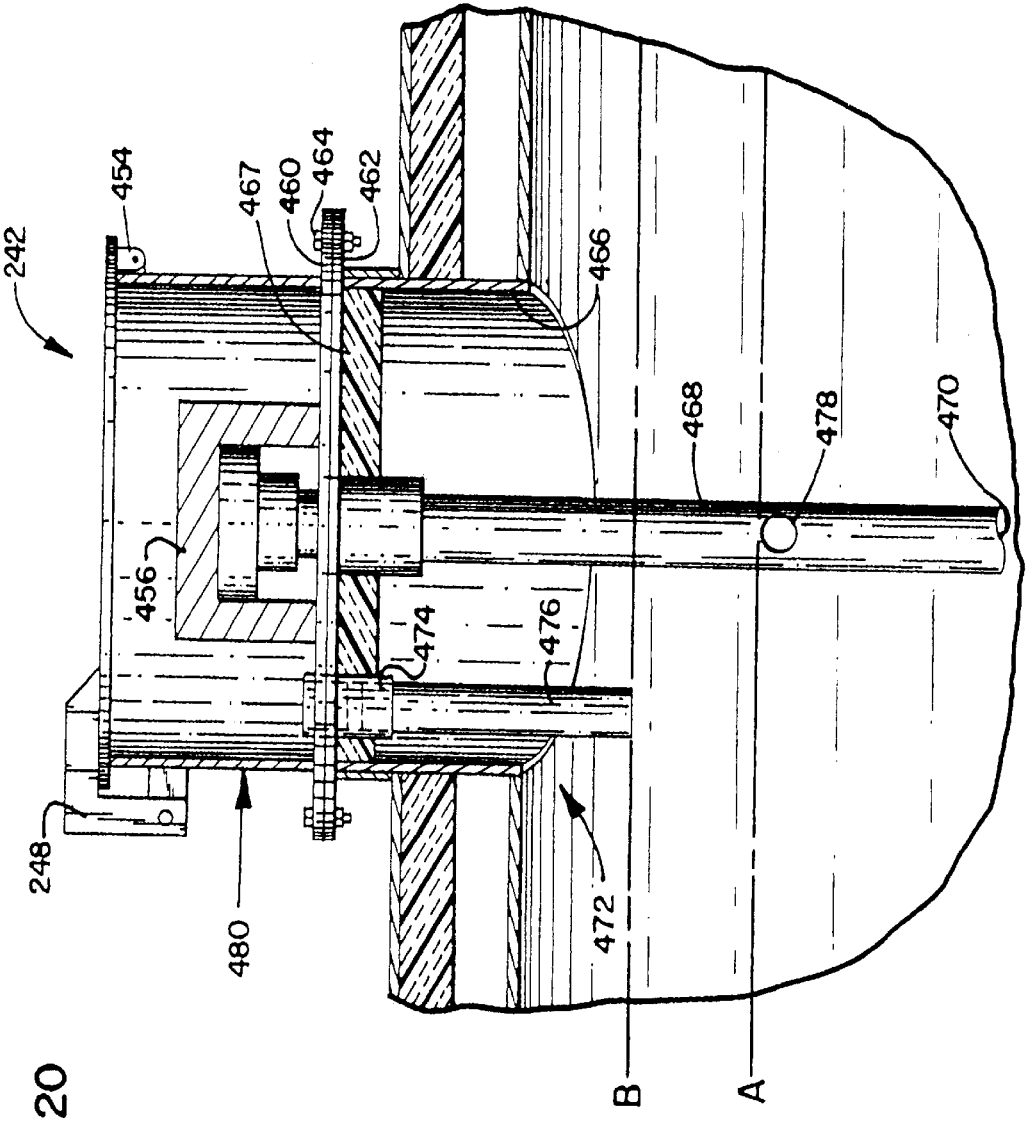
FIG. 20 is a fragmentary elevational view of a component in the system which is depicted in FIG. 19.

A portable fueling facility 410 according to a fourth embodiment of the invention is illustrated in FIGS. 19 and 20. Except as otherwise discussed, it should be assumed that system 410 is identical is structure and operation to the embodiment of the invention disclosed in FIGS. 9–16. Referring to FIG. 19, system 410 includes a system 412 for holding and containing vapor from the storage tank and preventing such vapor from escaping into the atmosphere.

Vapor containing system 412 includes an expandable bladder 414 which is provided within a chamber 416 defined by the inner wall of outer tank 212 and an outer end wall of storage tank 214. Bladder 414 defines an expandable inner space 412 that is in communication with an upper portion 422 of storage tank 214 via a fitting 418, as may be seen in FIG. 19. Preferably, bladder 414 is fabricated from an elastomeric material that is resistant to degradation from petroleum-based liquids and vapors. Most preferably, this material is a soft rubber such as BUNA N.

Vapor containing system 412 includes an arrangement 424 for removing any condensate or liquid fuel that may have collected in bladder 414. Condensate removing arrangement 424 includes a drainage tube 426 which has a first end connected to and in communication with a lowermost end of bladder 414, and a second end connected to a valve 428 which is accessible from outside outer tank 212.

In operation, bladder 414 will expand to accommodate vapor from storage tank 214 when storage tank 214 heats or is filled. When storage tank 214 cools or is emptied, the resilient material forming the wall of bladder 414 will compress the vapor within space 420, thereby forcing the vapor back into storage tank 214 through fitting 418. In this manner, vapor that would otherwise be forced out of tank 214 into the atmosphere is conserved and prevented from contaminating the environment. Periodically, an operator removes condensate from bladder 414 by opening valve 428 and draining the condensed fuel into a suitable container.

As is further shown in FIG. 19, an open vent 429 is provided to vent chamber 416 to atmosphere. This ordinarily does not result in the release of vapor to atmosphere, since any vapor should be contained within bladder 414. To permit access to chamber 416 for servicing of bladder 414 or the condensate removing arrangement 424, an access panel 427 is provided in the wall of outer tank 212.

A gauge 430 is provided to monitor the level of fuel within storage tank 214. Gauge 430 is preferably of the type that has a display resembling the face of a clock.

System 410 further includes a siphon supply arrangement 432 for conveying fuel from storage tank 214 to the fuel pump. Siphon supply arrangement 432 includes a fuel supply line 434 which includes a lower horizontal section 436 that is connected to a fuel pump in the manner described above with reference to the embodiment of FIG. 11. Fuel supply line 434 further includes a vertical section 438 which runs vertically from lower horizontal section 436 within a space between storage tank 214 and a front wall 452 of outer tank 212. A top end of vertical section 438 is connected to an upper horizontal section 440, which in turn is connected at its second end with a vertical intake section 444, which enters storage tank 214 at an upper portion 442 thereof and extends down within storage tank 214 to an intake end 446 which is proximate a bottom surface of storage tank 214. A fire wall 450 is provided between vertical section 438 and the front wall 452 of outer tank 212 for thermally insulating supply line 434. An access port 448 is provided directly above horizontal section 440 for providing access to the siphon supply arrangement 432.

In operation, if a fire should occur, supply arrangement 432 is insulated against direct contact with any flames by fire wall 450. The vertical section 438 of supply line 434 will first absorb any heat that is transmitted through fire wall 450. In any siphon, lower pressure will exist in the highest part of any piping through which the siphon is routed. In the case of supply arrangement 432, any fuel within supply line 434 is at its lower pressure in horizontal section 440 and in the upper portions of vertical section 438. As heat is transmitted by a fire to vertical section 438 and horizontal section 440, the combined effect of heating and existing under pressure will tend to vaporize fuel within these sections, thereby expanding the fuel and forcing any liquid fuel down through vertical intake section 444 into tank 214. As a result, the highly flammable fuel is kept constrained in storage tank 214 for as long as possible, while the fire can be put out.

Referring now to FIGS. 19 and 20, it will be seen that system 410 is provided with a receptacle 242 that is identical to that disclosed in previous embodiments, with the exceptions noted hereinbelow. Receptacle 242 includes a cover having a lock 454 thereon, which can be used to lock the cover into position when access to a removable fill cap cover 456 and fill cap 458 therein is not desired. As may be seen in FIG. 20, receptacle 242 includes a lower flange 460 that is mounted to a flange 462 on outer tank 212 by a plurality of bolts 464. Flange 462 is welded to a cylinder-shaped mounting sleeve 466 which is in turn welded to the edges of aligned openings which are defined in outer tank 212 and storage tank 214. A thermal lining 467 is provided immediately beneath flange 462 for maintaining the thermal insulation of any fuel that may be contained within storage tank 214. Thermal lining 467 works in conjunction with the insulation material 240, which is installed in a manner identical to that set forth in regard to the embodiment of FIGS. 9–16. To provide even more complete thermal insulation for the system, insulation material is also wrapped about pressure/vacuum vent 232, emergency vent 230 and access port 448. Such insulation material is also preferably Kaowall 2300 ceramic blanket, but alternatively could be a different insulation material.

A fill pipe 468 extends vertically downwardly from a lower surface of flange 462 into storage tank 214, terminating at a lower opening 470. When receptacle 242 is assembled onto system 410, access to fill pipe 468 can be gained by removing the cover of receptacle 242, removing the fill cap cover, and unscrewing the fill cap 458.

According to one novel aspect of system 410, a fill warning system 472 is provided which includes a whistle 474 interposed between storage tank 214 and the spill container space 480 defined within receptacle 242. As may be seen in FIG. 20, whistle 474 thus extends through openings that are provided in the flanges 460, 462. As shown in FIG. 20, fill pipe 468 has a pressure port 478 defined therein at a vertical location on fill pipe 468 which represents a first predetermined fill level A. In the preferred embodiment, level A represents the point at which storage tank 214 is 90% filled. A drain pipe 476 is in communication with a lower end of whistle 474, and extends downwardly from whistle 474 to a lower end that is positioned at a second predetermined fill level B. In the preferred embodiment, level B represents the point at which storage tank 214 is 95% filled.

In operation, a nozzle from a filling truck is inserted into fill pipe 468 after removal fill cap 458, and fuel is pumped into storage tank 214 via fill pipe 468. As vapor and air are displaced from within storage tank 214, they are forced through pressure port 478 into fill pipe 468 and escape into the atmosphere or into a vapor recovery system which is provided in the fill nozzle attached to fill pipe 468. When the fuel level in tank 214 reaches level A, though, pressure port 478 becomes immersed, and vapor and air can no longer escape therethrough. At this point, an over-pressure is temporarily created in the upper portion of storage tank 214. Whistle 474 is constructed to operate at a certain pressure, which is reached at this point. Accordingly, an audible whistle is created as vapor and air escape into drain pipe 476 and are forced through whistle 474. The operator at this point realizes that the level in tank 214 has reached level A. The fuel level then continues to rise until it reaches level B, thereby sealing off the lower end of drain pipe 476. At this point, the whistle ceases, and the operator is alerted to the fact that level B has been reached. The operator has been trained to stop pumping fuel into the storage tank 214 when this occurs.

If, during the filling process, fuel should spill into the spill container 480, it will drain through whistle 474 and drain pipe 476 back into storage tank 214. Whistle 474 thus acts as both a fill warning system and a drain for spill container 480.

Figure 21:
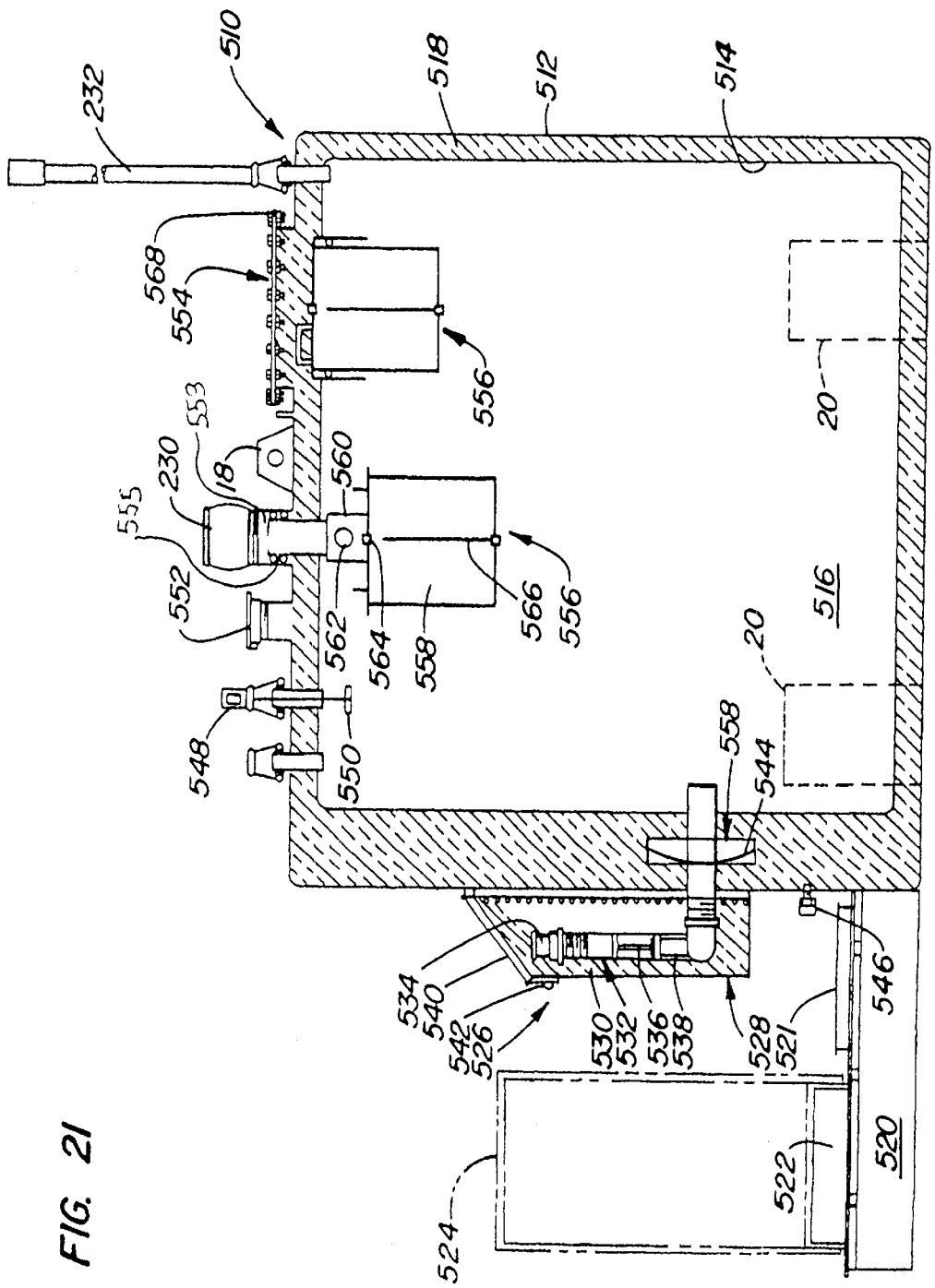
FIG. 21 is a longitudinal cross-sectional view through a portable fueling facility that is constructed according to a fourth embodiment of the invention.

An improved fueling facility 510 that is constructed according to a fourth embodiment of the invention is depicted in FIG. 21. Facility 510 includes an outer tank 512, an inner storage tank 514, and a storage space 516 that is defined within the storage tank 514. A fireproof insulation material 518 is interposed within the interstitial space that is defined between the outer tank 512 and the storage tank 514. The construction of facility 510 is the same as described with respect to previous embodiments, except for the differences specifically noted herein.

A number of saddle members 20 are provided for supporting the outer tank 512, and thus the entire assembly 510, with respect to an underlying horizontal surface, such as the ground or a paved or concrete surface. Facility 510 further includes a deck compartment 520 for providing secondary containment about supply pipes leading from storage space 516 to a pump 524 (not shown). Deck compartment 520 is identical to those described above for previous embodiments, except for the provision of an access hatch 521, and a pump riser 522. Pump riser 522 is rectangular in cross section, and extends upwardly from deck compartment 520, as is shown in FIG. 21. Pump riser 522 is sized to securely fit within a recess that is defined at the bottom of pump 524. Thus, pump riser 522 provides a secure mounting structure for pump 524, which is especially advantageous in that it prevents water from rain and melting snow from entering deck compartment 520.

Referring again to FIG. 21, improved facility 510 includes a bottom load assembly 526 for filling the storage space 516 defined within storage tank 514 with product. As may be seen in FIG. 21, bottom load assembly 526 includes an insulated, fireproofed compartment 528 that is mounted securely to the outside of outer tank 512 adjacent to pump 524. Compartment 528 is lined with insulation material 530, which preferably is the same thermal ceramic fiber material that is provided in the interstitial space between outer tank 512 and storage tank 514. A supply pipe 532 that is in communication with storage space 516 extends through the interstitial space between storage tank 514 and outer tank 512, through the outer wall of outer tank 512 and into the compartment 528, where it terminates in a threaded nipple. A cap 534 with a filtering screen is ordinarily provided on the threaded nipple. A gate valve 536 and a check valve 538 are interposed in supply pipe 532. Compartment 528 includes a hinged cover 540 for providing access to the supply pipe 532 and cap 534. A lock 542 is preferably provided on the exterior of compartment 528 to prevent unauthorized access to the components therein.

According to one important aspect of the invention, a heat sink 544 is mounted in the interstitial space between outer tank 512 and storage tank 514 in thermal communication with supply pipe 532. Heat sink 544, shown in FIG. 21, is preferably a mass of metallic material, such as a series of ¼ inch steel plates, 24 inches in diameter. Advantageously, heat sink 544 is positioned between storage tank 514 and the most likely location for a fire emergency, which is the area around pump 524. In the event of a fire near pump 524, heat sink 544 will intercept some of the radiated heat that would otherwise be transmitted to storage tank 514, creating a hot spot which could cause auto-ignition of gasoline or other fuel in storage tank 514, accordingly providing further protection against a fire-related emergency.

Another important aspect of improved facility 510 is the provision of an interstitial gauge 546 for monitoring the appearance of any liquid within the interstitial space that is defined between outer tank 512 and storage tank 514. This enables maintenance personnel to determine if the product tank is leaking.

As may be seen in FIG. 21, improved facility 510 further includes a level gauge 548 for monitoring the level of product within the storage space 516, which has a float 550 that is suspended within storage space 516. Facility 510 further includes an interstitial emergency vent 552 that is designed to open when pressure in the interstitial space between outer tank 512 and storage tank 514 exceeds a predetermined maximum. If storage tank 514 should be breached, emergency vent 552 will release pressure from the interstitial space that could otherwise result in a catastrophic failure.

Improved facility 510 further includes an emergency vent 230 and a working vent 232, which are constructed and arranged in the same manner as discussed above with reference to previously disclosed embodiments.

Figure 22:
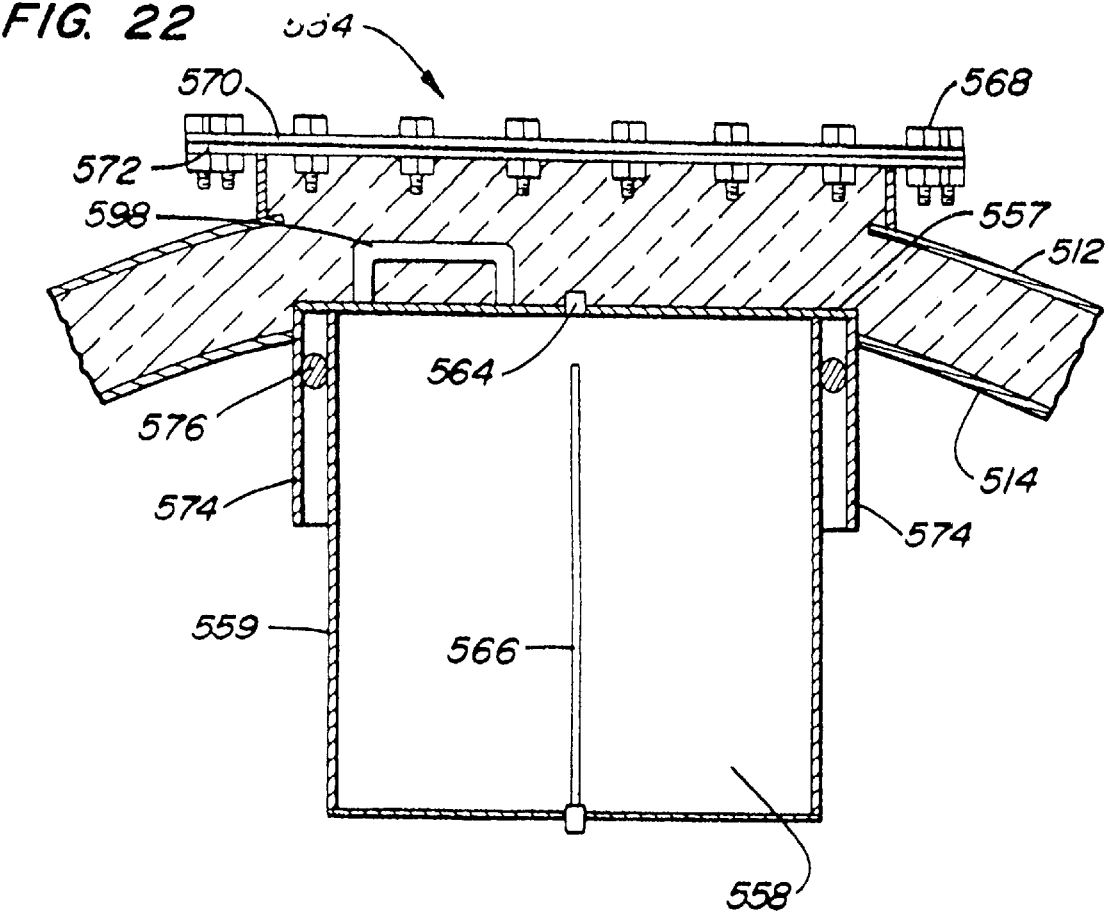
FIG. 22 is a fragmentary cross-sectional view taken through one component of the assembly that is depicted in FIG. 21.

Facility 510 includes a manway 554 that is, as was the case in previously disclosed embodiments, sized to permit a service person to physically enter storage space 516. One important aspect of the invention is the provision of a heat suppression system 556 that is mounted, preferably, directly beneath manway 554, as well as beneath emergency vent 230, as may best be seen in FIG. 21. Heat suppression system 556 includes a chamber 558 that is constructed and arranged to hold a coolant liquid, which is preferably a water-propylene glycol solution. A fuse 566 is provided within chamber 558 for releasing fluid from chamber 558 into storage space 516 when the temperature and storage space 516 exceeds a predetermined maximum. A service plug 564 is provided at the top of chamber 558 for permitting a service person access to the space within chamber 558, such as during refilling or replacement of the fluid within chamber 558. As may be seen in FIG. 22, chamber 558 includes at least one sidewall 559, and a top plate 557 in which service plug 554 is mounted. Top plate 557 preferably extends slightly outwardly from sidewall 559 to form a flange or lip, as is shown in FIG. 22. As is shown in FIG. 22, a socket for supporting heat suppression system 566 is defined in storage tank 514 by a wall 574 that is welded to storage tank 514. Heat suppression system 566 is lowered into this socket so that top plate 557 rests on the upper edge of wall 574. An o-ring 576 is positioned between wall 574 and the sidewall 559 of chamber 558 to ensure stability and to form a pressure seal between the storage space 516 and the interstitial space that is defined between outer tank 512 and storage tank 514. A handle 598 is conveniently provided affixed to top plate 557 for lifting the heat suppression system 566 out through manway 554.

As may be seen in FIG. 21, emergency vent 230 is communicated with storage tank 514 by a pipe 555 that terminates in a stem 560. Vent 230 further includes an outer pipe 553 that terminates in a stem 560. Vent 230 further includes an outer pipe 553 that is sealed with respect to outer tank 512. Advantageously, pipe 555 is insulated with respect to pipe 553 by insulation material 557, which preferably includes ceramic fiber rope packing. In addition, a high temperature silicone sealant is used to keep ambient air or fumes from entering the interstitial space. The same packing and sealant is preferably used on other openings, such as that for working vent 232 and gauge 548 as well.

The heat suppression system 556 that is suspended beneath emergency vent 230 is identical in construction to that described above, except that there is no mounting socket, and top plate 557 is welded to a stem 560 that depends downwardly from the outer wall of storage tank 514. At least one vent hole 562 is provided in stem 560 to communicate vent 230 with the storage space 516 that is defined within storage tank 514.

Referring again to FIG. 22, it will be seen that manway 554 includes a lower plate 572 that is secured to outer tank 512, and a removable upper plate 570 that is releasably secured to lower plate 572 by means of a number of bolts 568.

Figure 23:
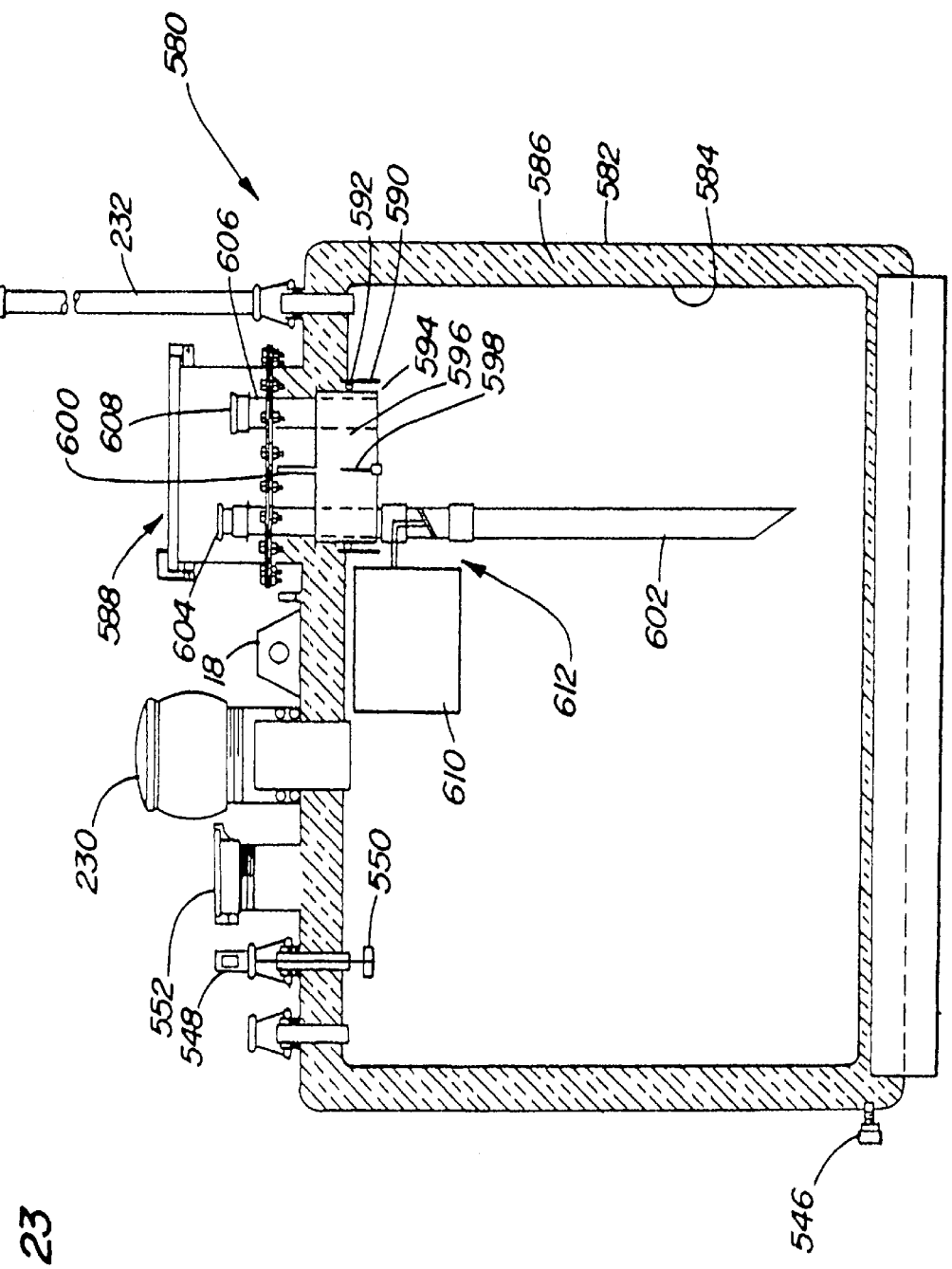
FIG. 23 is a longitudinal cross-sectional view through a portable fueling facility that is constructed according to a fifth embodiment of the invention.

Referring now to FIG. 23, an improved facility 580 that is constructed according to a fifth embodiment of the invention will be discussed. Facility 580 includes an outer tank 582, a storage tank 584 and insulation material 586 that is constructed in the same manner as that described above with reference to previous embodiments. Facility 580 is designed to be filled from the top through a fill tube 602 that is accessible by means of a manway hatch 588. Fill tube 602 is depicted in FIG. 23, and has a cap 604 mounted thereon in the space that is defined by manway hatch 588. A Stage I vapor recovery tube 606 also communicates the space within storage tank 584 with the space defined within manway hatch 588 for permitting recovery of vapor from the storage tank 584 during filling. A cap 608 is shown mounted on the upper, outside end of vapor recovery tube 606.

Facility 580 includes a heat suppression system 594 that is similar to that discussed above with reference to the previous embodiment. Heat suppression system 594 includes a socket defined within storage tank 584 by a wall 590, a chamber 596 for storing a coolant solution, which is preferably a water-propylene glycol solution, a fuse 598 for dispersing the coolant within storage 584 when the temperature within storage tank 584 reaches a predetermined maximum, and a service plug 600 for permitting access to the chamber 596 from manway hatch 588.

As may be seen in FIG. 23, an O-ring 592 that is interposed between wall 590 and chamber 596 seals chamber 596 with respect to storage tank 584. The operation of heat suppression system 594, and the heat suppression system 556 of the previously described embodiment will be discussed in greater detail below.

Improved facility 580 further includes a fill level sensor/control 610 that is coupled to a shut-off valve 612 that is interposed within fill tube 602. During filling, when the level of product within storage tank 584 exceeds a predetermined level, fill level sensor/control 610 will automatically close valve 612 so that no further product will be accepted into the tank 584.

The heat suppression systems 556, 594 of the last described two embodiments operate as follows. In the event of a fire or other heat-related emergency outside of the outer tank 582, the insulation material in the interstitial space will, in conjunction with the heat sink 544 described with reference to the embodiment of FIG. 21, keep the respective storage tank cool for some time. At some point, however, the storage tank will begin to heat to the extent that spontaneous combustion of the product therein becomes possible. Before that temperature is reached, the fuse of the heat suppression system will melt and cause the coolant from the chamber of the heat suppression system to become dispersed within the storage tank. This spray of coolant will, first, cool the storage tank, thus providing additional time before the temperature reaches the critical point. However, once the temperature again climbs to the critical point, the inert gas provided by the vaporized coolant will neutralize the combustible vapors within the storage tank, thus preventing combustion from occurring.

Figure 24A:
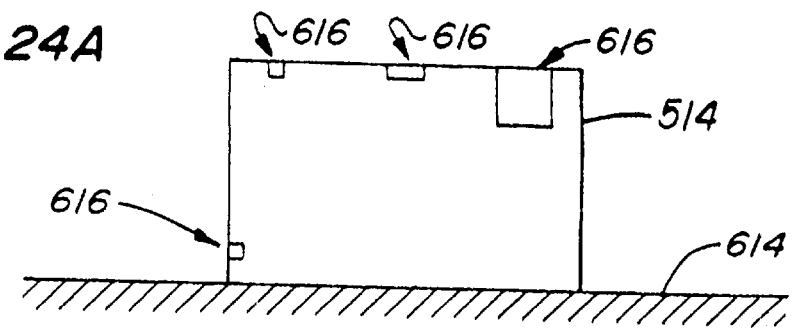
FIGS. 24(a)–24(f) are diagrammatical depictions of a preferred method of assembly for portable fueling facilities that are constructed according to the invention.
Figure 24B:
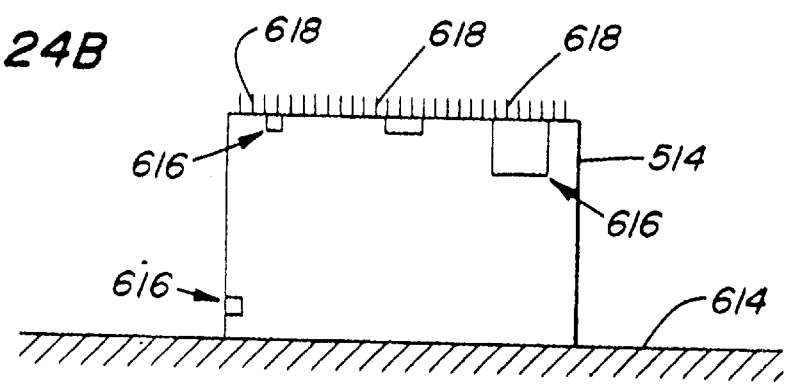
Figure 24C:
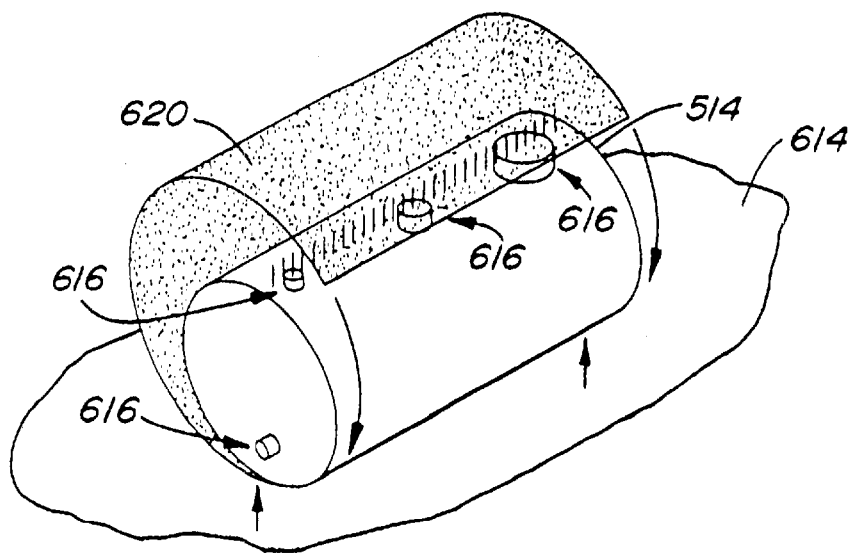
Figure 24D:
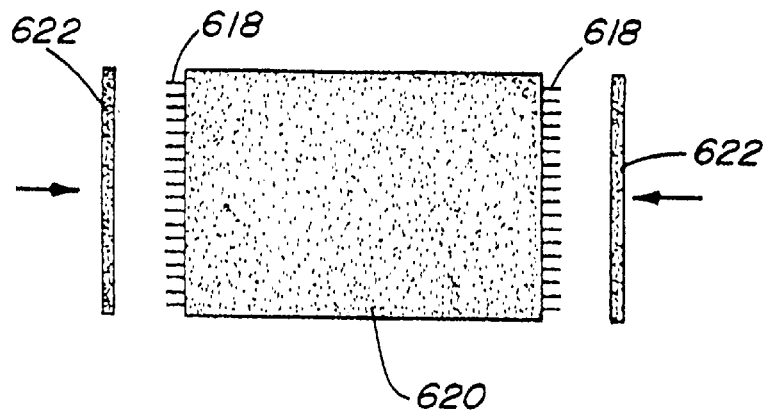
Figure 24E:
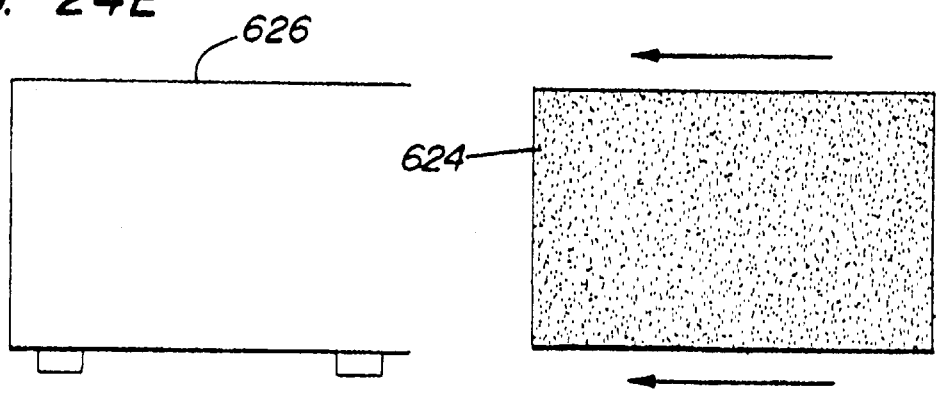
Figure 24F:
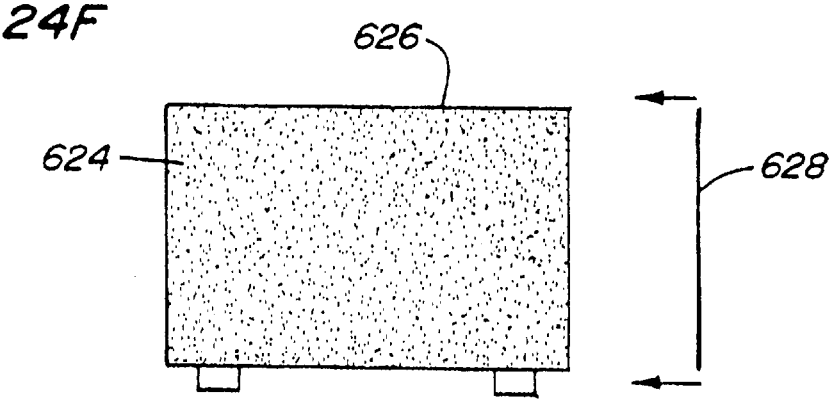

FIGS. 24(a)–24(f) diagrammatically depict a preferred method for assembling a facility according to the invention. As shown in FIG. 24(a), storage tank 514 is formed, and the necessary fittings 616 are installed in the storage tank 514. As shown in FIG. 24(b), a number of nails are welded to the upper portion of storage tank 514. Subsequently, as shown in FIG. 24(c), storage 514 is elevated, and a blanket 620 of fire retardant, insulation material, most preferably thermal ceramic fiber as described hereinabove, is wrapped about the circumferential portion of storage tank 514. During this process, the nails 618 help keep the insulation material 620 securely fastened to the storage tank 514. As shown in FIG. 24(d), more nails 618 are then welded to the end portions of storage tank 514, and sections 622 of insulation material, also preferably thermal ceramic fiber blanket, are pressed onto the nails 618. The shell of outer tank 626 is preferably split open longitudinally; a portion thereof is depicted in FIG. 24(f). The storage tank assembly with the insulation material 624 thereon is then guided longitudinally into the outer tank assembly 626, as is shown in FIG. 24(e). After insertion, outer tank 626 is closed, and an end plate 628 is welded to the outer tank assembly 626, as shown in FIG. 24(f).

Figure 25:
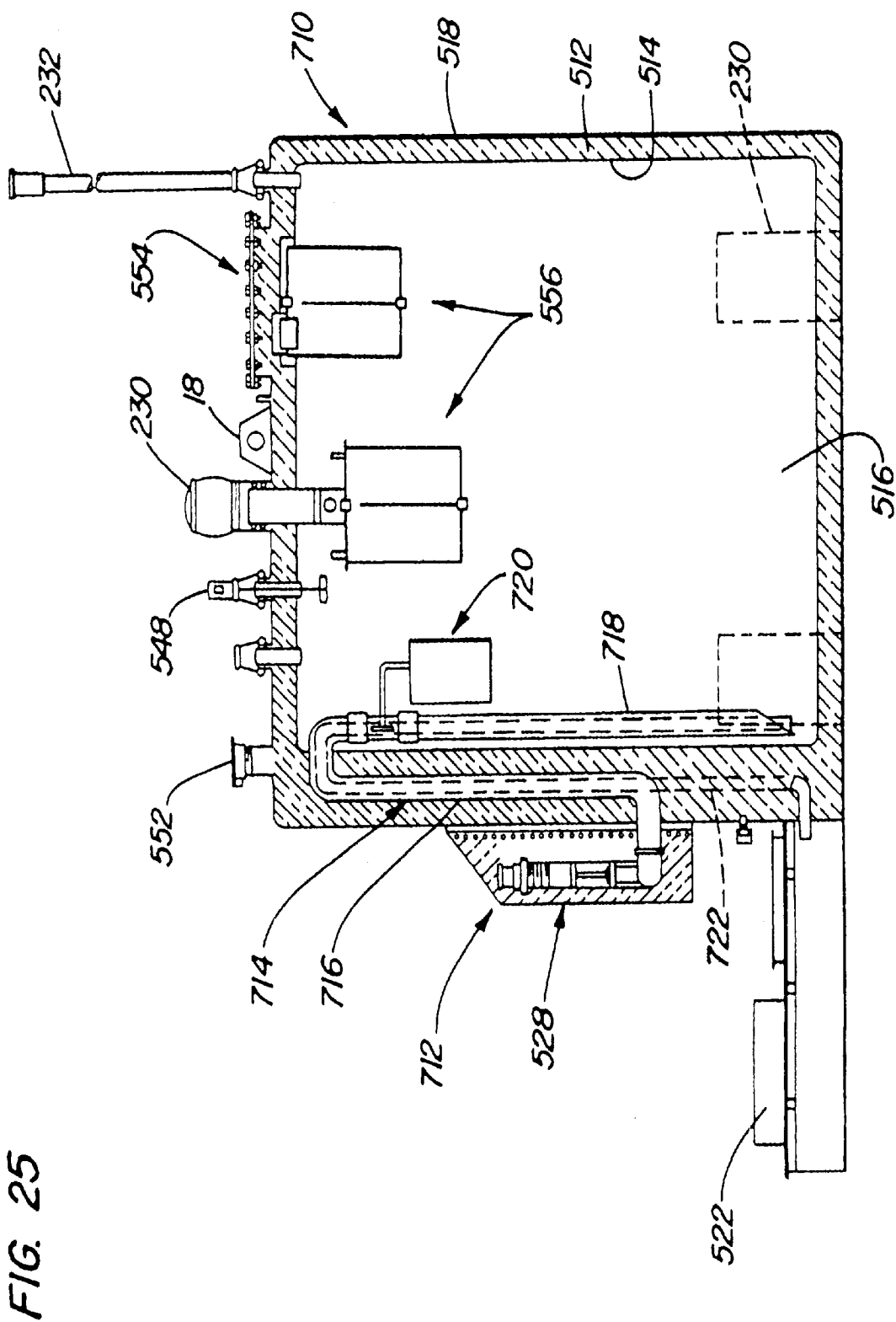
FIG. 25 is a longitudinal cross-sectional view through a portable fueling facility that is constructed according to a sixth embodiment of the invention.

An improved portable fueling facility 710 that is constructed according to a sixth embodiment of the invention is depicted in FIG. 25. Facility 710 is substantially identical to the embodiment of the invention shown in FIG. 21, except that it includes an improved product loading assembly 712 for loading product, such as gasoline, into storage tank 514. Product loading assembly 712 differs from that in the previously described embodiment in that it includes a fill pipe 714 that has an ascending portion 716 and a descending portion 716. The ascending portion 716 extends in the space between outer tank 512 and storage tank 514 upwardly from the level of compartment 528 to a location near the top of storage tank 514, where it enters storage tank 514 and joins the descending portion 718. The descending portion 718 descends from this level within storage tank 514 to a location proximate the bottom of storage tank 514, as is shown in FIG. 25. An overfill prevention valve is interposed in descending portion 718 to automatically close and prevent fuel from being pumped into storage tank 514 through fill pipe 714 once the product in storage tank 514 reaches a predetermined maximum level. Facility 710 further includes a supply pipe 722 for supplying product from storage tank 514 to an external pump that is positioned on pedestal 522. Supply pipe 722 is communicated with a lower portion of the space 516 within storage tank 514, and includes an ascending portion within storage tank 514 that leads to a top portion of and exits storage tank 514, and a descending portion that descends downwardly between storage tank 514 and outer tank 512, into the deck compartment and pedestal 522, then into the pump that is mounted on pedestal 522.

The construction of the improved product loading assembly 712 and of supply pipe 722 is advantageous in a number of ways. First, the fittings in storage tank 514 are positioned at the top of storage tank 514, rather than the bottom, above the anticipated level of the product. As a result of this, a poorly installed or damaged fitting is less likely to leak product into the interstitial space between storage tank 514 and outer tank 512. Second, during a fire-related emergency, the length of fill pipe 714 and supply pipe 722 will act as a heat sink to dissipate heat that would otherwise be conducted to storage tank 514 and the product therein. Third, also during a fire-related emergency, heat will tend to vaporize any product that is in the upper end turn portions of pipes 714, 722 first, which pushes product down the respective descending portions of the pipes and creates a pressure barrier that will deter product from being forced out of the storage tank 514.

Figure 26:
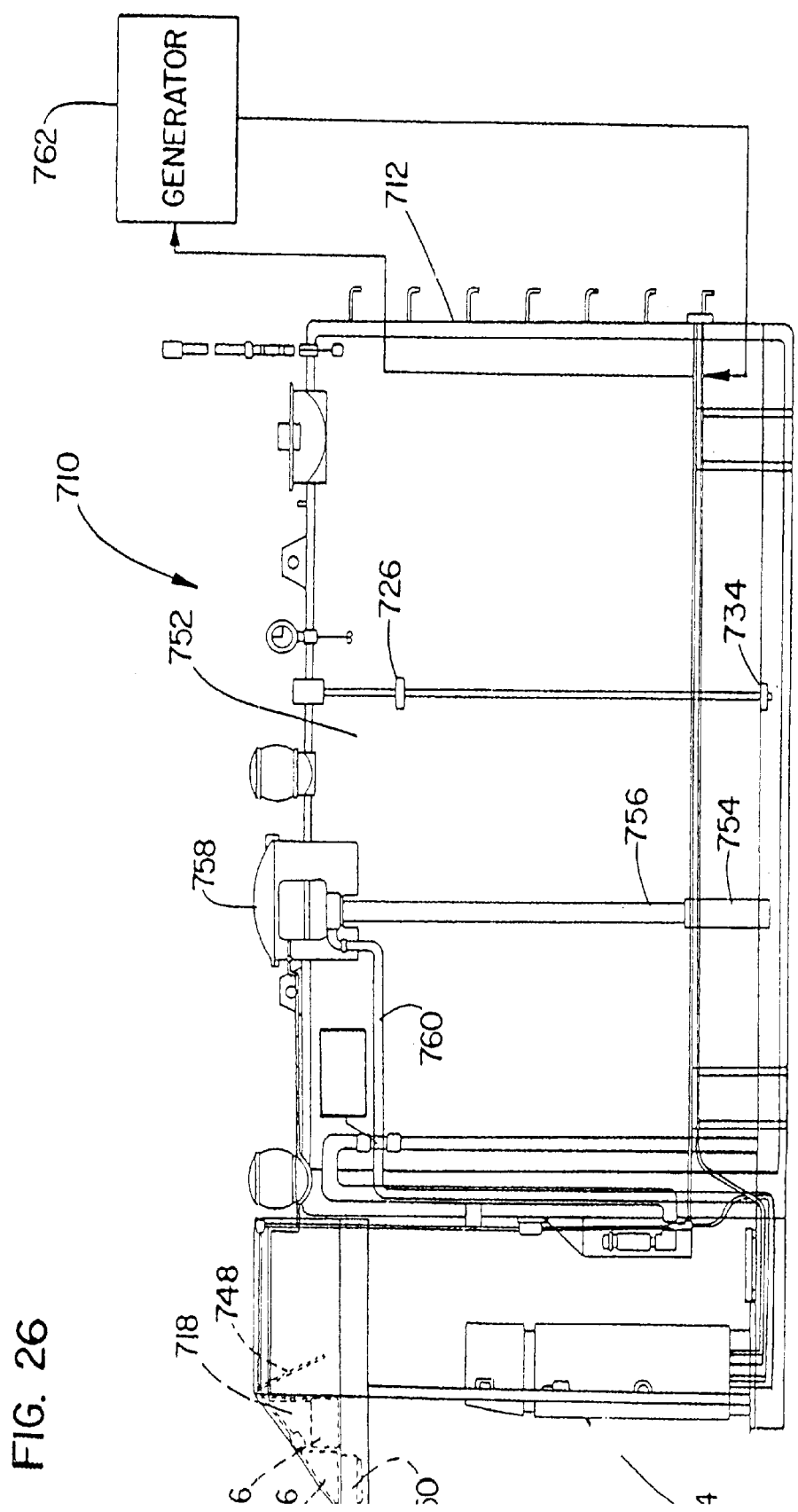
FIG. 26 is a longitudinal cross-sectional view through a portable fueling facility that is constructed according to a seventh embodiment of the invention.

Referring now to FIGS. 26 and 27, a fluid dispensing system 710 that is constructed according to a seventh embodiment of the invention includes a storage facility 712 for storing a combustible fluid and a dispensing system 714 for dispensing the combustible fluid from the storage facility 712.

As may be seen physically in FIG. 26 and schematically in FIG. 27, storage facility 712 includes an electronic control system 716 for controlling the system 710 that is advantageously mounted within an environmentally controlled compartment 718 that is environmentally regulated and is insulated from any electrical sparks or open flames that may occur within the vicinity of the fluid dispensing system 710. The compartment 718 includes separate heating and cooling systems that are designed so as to be adjustable by an attendant. Since it is contained within the environmentally controlled compartment 718, the electronic control system 716 need not be explosion proof, as was required in conventional systems prior to this invention. This can substantially reduce the cost of manufacturing and maintaining the dispensing system 710.

The electronic control system 716 is shown schematically in FIG. 27. It includes a storage facility sensing system 720 for monitoring certain conditions that can be critical to the operation of the combustible fluid dispensing system 710. The different sensors in the storage facility sensing system 720 will be discussed in greater detail below.

As may be further seen in the schematic representation of the control system that is depicted in FIG. 27, the system 710 preferably includes several remote units for receiving information from the storage facility sensor system 720. As is shown schematically in FIG. 27, the connection between the remote units 722 and the rest of the control system may be made through a direct connection, such as by telephone wire, or by a wireless connection, such as by using VHF or cellular telephone technology. In the illustrated embodiment, the remote units 722 include a vehicle transmitter 764 which is capable of receiving and sending information to the control system, a remote owners module 740, which is also capable of receiving and/or sending information to the system, the service center 160 referred to above in reference to other embodiments of this invention, and a telephone 38, also described above.

The dispensing system 714 is shown schematically in FIG. 27 as well. Preferably, it includes a pump and dispenser control unit 158, which controls operation of one or more pumps 744, one or more fuel additive injectors 736, one or more dispensers 738, and one or more combustible fluid blending systems 742. The actual construction of the injector 736, dispensers 738, blending system 742, and pumps 744 may be conventional as is known in the industry. In the preferred embodiment, shown in FIG. 26, the pumps are embodied as a submergible pump 754 that is positioned near the bottom of the storage tank in the fluid dispensing system 710. Advantageously, pump 754 and its attached fuel conduit 756 are suspended within the storage facility 712 from a spill containment area 758, which is constructed in a manner that is described above with reference to other embodiments of the invention. The system operates so that the pressure for moving the combustible liquid from the storage facility 712 into a vehicle is developed entirely by the submergible pump 754; the dispensing system 714 simply acts as a valve to permit or preclude movement of the combustible liquid to an intended destination vehicle and a meter to measure volume.

Referring again to the sensing system 720, the system preferably includes a first sensor system for detecting indicia of the quantity of combustible fluid in the storage facility 712, which is in the preferred embodiment a fuel level sensor 726. Fuel level sensor 726 is also depicted in FIG. 26, and is part of a system that also includes a water level sensor 734 for detecting the level of water that inevitably collects at the bottom of the storage facility 712. This system is commercially available from Veeder-Root as Model TLS-350. Sensing system 720 further includes a sensor in the interstitial space between the inner and outer tanks in storage facility 712, for detecting leakage of the combustible fluid into the interstitial space. This leak detection sensor 730 is also commercially available from Veeder-Root, and is designed to detect the presence of hydrocarbons in the interstitial space.

Sensing system 720 further includes a third sensor system for detecting indicia of foreign matter contamination in the combustible fluid, which is embodied as a sensor 728 for detecting the presence of biocontaminates in the storage facility 712. This sensor is also commercially available from Veeder-Root.

Referring again to FIG. 26, it will be seen that the environmentally controlled compartment 718 for the electronic control system 716 is advantageously mounted in a hood member 746 that is detachably mounted to the storage facility 712. Hood unit 746 further includes a light 750 for providing illumination during operation, and a door 748 is provided for gaining access to the compartment 718.

Another advantageous feature of the system 710 that is shown in FIGS. 26 and 27 is the provision of an electrical generator 762, shown schematically in FIG. 26, for providing all of the power that is necessary for operation of the system 710. Generator 762 is designed to operate by using the combustible fluid that is stored within storage facility 712. Provision of the generator 762 makes the unit 710 fully self-sufficient at locations that do not have a ready source of electrical power.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of facilitating self-service fueling, comprising steps of:
    (a) positioning at a desired dispensing location an aboveground self-service fueling module that includes at least one aboveground storage tank and an attached dispensing pump of the type that is configured to allow an individual to fill a vehicle;
    (b) loading fuel into the aboveground storage tank; and
    (c) permitting a person to refuel a vehicle with fuel that is drawn from the aboveground storage tank by using the dispensing pump, and wherein step (a) is performed by positioning at a desired dispensing location an aboveground retail fueling module that includes at least one aboveground storage tank, an attached dispensing pump and an attached canopy for protecting a user during a fueling transaction, and wherein step (c) is performed by permitting a person to refuel a vehicle while standing beneath the canopy.

2. A method of facilitating self-service fueling, comprising steps of:
    (a) positioning at a desired dispensing location an aboveground self-service fueling module that includes at least one aboveground storage tank and an attached dispensing pump of the type that is configured to allow an individual to fill a vehicle;
    (b) loading fuel into the aboveground storage tank;
    (c) permitting a person to refuel a vehicle with fuel that is drawn from the aboveground storage tank by using the dispensing pump; and
    (d) communicating with the person from a remote service facility that is remote from the aboveground retail fueling module.

3. A method of facilitating self-service fueling, comprising steps of:
    (a) positioning at a desired dispensing location an aboveground self-service fueling module that includes at least one aboveground storage tank and an attached dispensing pump of the type that is configured to allow an individual to fill a vehicle;
    (b) loading fuel into the aboveground storage tank;
    (c) permitting a person to refuel a vehicle with fuel that is drawn from the aboveground storage tank by using the dispensing pump; and
    (d) telephonically communicating with the person from a remote service facility that is remote from the aboveground retail fueling module.

4. A method of retailing fuel, comprising steps of:
    (a) positioning at a desired dispensing location an aboveground retail fueling module that includes at least one aboveground storage tank, an attached dispensing pump and structure for supporting the storage tank and dispensing pump together as a unit on an underlying surface and an attached canopy for protecting a user during a fueling transaction;
    (b) loading fuel into the aboveground storage tank;
    (c) permitting a customer to refuel a vehicle with fuel that is drawn from the aboveground storage tank by using the dispensing pump, and wherein step (c) is performed by permitting a person to refuel a vehicle while standing beneath the canopy;
    (d) determining whether the desired location is still the preferred location for the module; and
    (e) if it is not the preferred location, re-positioning the aboveground fueling module to a different location.

5. A method of retailing fuel, comprising steps of:
    (a) positioning at a desired dispensing location an aboveground fueling module that includes at least one aboveground storage tank, an attached dispensing pump and structure for supporting the storage tank and dispensing pump together as a unit on an underlying surface;
    (b) loading fuel into the aboveground storage tank;
    (c) permitting a customer to refuel a vehicle with fuel that is drawn from the aboveground storage tank by using the dispensing pump;
    (d) determining whether the desired location is still the preferred location for the module;
    (e) if it is not the preferred location, re-positioning the aboveground fueling module to a different location; and
    (f) communicating with the person from a remote service facility that is remote from the aboveground retail fueling module.

6. A method of retailing fuel, comprising steps of:
    (a) positioning at a desired dispensing location an aboveground fueling module that includes at least one aboveground storage tank, an attached dispensing pump and structure for supporting the storage tank and dispensing pump together as a unit on an underlying surface;
    (b) loading fuel into the aboveground storage tank;
    (c) permitting a customer to refuel a vehicle with fuel that is drawn from the aboveground storage tank by using the dispensing pump;
    (d) determining whether the desired location is still the preferred location for the module;
    (e) if it is not the preferred location, re-positioning the aboveground fueling module to a different location; and
    (f) telephonically communicating with the person from a position that is remote from the aboveground retail fueling module.

7. A method of retailing fuel, comprising steps of:
    (a) positioning at a desired dispensing location an aboveground retail fueling module that includes at least one aboveground storage tank, an attached dispensing pump, structure for supporting the storage tank and dispensing pump together as a unit on an underlying surface and an attached canopy for protecting a user during a fueling transaction, step (a) being performed so that the dispensing pump is accessible to a vehicle operator;

(b) loading fuel into the aboveground storage tank; and (c) permitting a customer to conduct a refueling transaction that comprises refueling a vehicle with fuel that is drawn from the aboveground storage tank by using the dispensing pump, and wherein step (c) is performed by permitting a person to refuel a vehicle while standing beneath the canopy; and (d) recording the transaction.

8. A method of retailing fuel, comprising steps of:

(a) positioning at a desired dispensing location an aboveground fueling module that includes at least one aboveground storage tank, an attached dispensing pump and structure for supporting the storage tank and dispensing pump together as a unit on an underlying surface, step (a) being performed so that the dispensing pump is accessible to a vehicle operator;

(b) loading fuel into the aboveground storage tank; and (c) permitting a customer to conduct a refueling transaction that comprises refueling a vehicle with fuel that is drawn from the aboveground storage tank by using the dispensing pump;

(d) recording the transaction; and (e) communicating with the person from a remote service facility that is remote from the aboveground retail fueling module.

9. A method of retailing fuel, comprising steps of:

(a) positioning at a desired dispensing location an aboveground fueling module that includes at least one aboveground storage tank, an attached dispensing pump and structure for supporting the storage tank and dispensing pump together as a unit on an underlying surface, step (a) being performed so that the dispensing pump is accessible to a vehicle operator;

(b) loading fuel into the aboveground storage tank; and (c) permitting a customer to conduct a refueling transaction that comprises refueling a vehicle with fuel that is drawn from the aboveground storage tank by using the dispensing pump;

(d) recording the transaction; and (e) telephonically communicating with the person from a position that is remote from the aboveground retail fueling module.

* * * * *